(12) United States Patent
Mathew et al.

(10) Patent No.: US 10,990,127 B2
(45) Date of Patent: *Apr. 27, 2021

(54) ELECTRONIC DEVICE DISPLAY STRUCTURES

(71) Applicant: Apple Inc., Cupertino, CA (US)

(72) Inventors: Dinesh C. Mathew, Fremont, CA (US); Bryan W. Posner, La Selva Beach, CA (US); Keith J. Hendren, Capitola, CA (US); Adam T. Garelli, Santa Clara, CA (US); Joss Nathan Giddings, San Francisco, CA (US); Thomas W. Wilson, Jr., Saratoga, CA (US); Victor H. Yin, Cupertino, CA (US); Jun Qi, Cupertino, CA (US); Paul Xiaopeng Wang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/952,111

(22) Filed: Apr. 12, 2018

(65) Prior Publication Data

US 2018/0232009 A1 Aug. 16, 2018

Related U.S. Application Data

(62) Division of application No. 14/754,455, filed on Jun. 29, 2015, now Pat. No. 9,990,001, which is a division (Continued)

(51) Int. Cl.
*G06F 1/16* (2006.01)
*H05K 5/02* (2006.01)
(Continued)

(52) U.S. Cl.
CPC .......... *G06F 1/1637* (2013.01); *G06F 1/1601* (2013.01); *G06F 1/1616* (2013.01);
(Continued)

(58) Field of Classification Search
CPC ........ G06F 1/16; G06F 1/1601; G06F 1/1616; G06F 1/1633; G06F 1/1637; H04M 1/0266; H04M 1/185; H05K 1/02; H05K 5/02
(Continued)

(56) References Cited

U.S. PATENT DOCUMENTS 6,144,360 A 11/2000 Evanicky et al.
6,532,152 B1 3/2003 White et al.
(Continued)

FOREIGN PATENT DOCUMENTS

EP 1633176 4/2007

*Primary Examiner* — Jason M Han
(74) *Attorney, Agent, or Firm* — Treyz Law Group, P.C.; G. Victor Treyz; Kendall W. Abbasi

(57) ABSTRACT

An electronic device may have a housing in which a display is mounted. A gasket may be mounted in a groove between the display and housing. The gasket may contain an embedded stiffener. Corner brackets may be installed in the corners of the housing. The housing may have inner and outer concentric ribs. Recesses in the housing may be configured to receive the corner brackets. The recesses may be formed between the inner and outer concentric ribs. Gap filling structures such as a foam layer may be interposed between a rear housing wall and a display backlight unit. Display color variations may be corrected by using a backlight unit having an array of light-emitting diodes of different colors. An electrostatic discharge protection layer may be grounded to a housing using conductive tape. Black edge coatings and adhesive-based structures may block stray light. Camera window regions may be supported using adhesive.

11 Claims, 22 Drawing Sheets

Related U.S. Application Data of application No. 13/629,503, filed on Sep. 27, 2012, now Pat. No. 9,075,567.

(60) Provisional application No. 61/657,232, filed on Jun. 8, 2012.

(51) Int. Cl.
*H04M 1/02* (2006.01)
*H04M 1/18* (2006.01)

(52) U.S. Cl.
CPC ....... *H05K 5/02* (2013.01); *G06F 2200/1612* (2013.01); *H04M 1/0266* (2013.01); *H04M 1/185* (2013.01)

(58) Field of Classification Search
USPC ................................ 362/632–634; 349/58–60
See application file for complete search history.

(56) References Cited

U.S. PATENT DOCUMENTS

| | | | |
|---|---|---|---|
| 6,559,907 B1 | 5/2003 | Byoun | |
| 6,909,475 B2 | 6/2005 | Kojima et al. | |
| 7,379,224 B2 | 5/2008 | Tonar et al. | |
| 7,492,422 B2 | 2/2009 | Ha et al. | |
| 7,619,709 B2 * | 11/2009 | Kang | G02F 1/133509 |
| | | | 349/139 |
| 7,697,275 B2 | 4/2010 | Chen et al. | |
| 7,760,491 B2 * | 7/2010 | Choi | G06F 1/1601 |
| | | | 361/679.01 |
| 7,764,333 B2 * | 7/2010 | Kim | G02B 6/0086 |
| | | | 349/58 |
| 7,771,100 B2 | 8/2010 | Yamamoto et al. | |
| 8,203,786 B2 * | 6/2012 | Hine | H04N 5/64 |
| | | | 349/58 |
| 8,264,822 B2 | 9/2012 | Sakamoto et al. | |
| 8,456,824 B2 | 6/2013 | Shi | |
| 8,537,568 B2 | 9/2013 | Tang | |
| 9,176,524 B2 * | 11/2015 | Kitamura | G06F 1/1637 |
| 2004/0156168 A1 | 8/2004 | LeVasseur et al. | |
| 2006/0061859 A1 | 3/2006 | Chen et al. | |
| 2008/0137020 A1 | 6/2008 | Takahashi et al. | |
| 2008/0111943 A1 | 12/2008 | Kim | |
| 2009/0147174 A1 * | 6/2009 | Ha | G02F 1/133606 |
| | | | 349/58 |
| 2010/0165556 A1 | 7/2010 | Sonehara et al. | |
| 2010/0188601 A1 | 7/2010 | Onishi | |
| 2010/0226118 A1 | 9/2010 | Baar | |
| 2010/0315769 A1 * | 12/2010 | Mathew | G06F 1/1637 |
| | | | 361/679.29 |
| 2011/0103041 A1 | 5/2011 | Mathew et al. | |
| 2012/0050638 A1 | 3/2012 | Nussbacher et al. | |
| 2012/0050640 A1 | 3/2012 | Yasui et al. | |
| 2012/0050975 A1 | 3/2012 | Garelli et al. | |

\* cited by examiner

ELECTRONIC DEVICE DISPLAY STRUCTURES

This application is a division of U.S. patent application Ser. No. 14/754,455, filed Jun. 29, 2015, which is a division of U.S. patent application Ser. No. 13/629,503, filed Sep. 27, 2012, which claims the benefit of U.S. provisional patent application No. 61/657,232, filed Jun. 8, 2012, all of which are hereby incorporated by reference herein in their entireties.

BACKGROUND

This invention relates to electronic devices and, more particularly, to structures for electronic devices such as display structures.

Electronic devices such as portable computers and cellular telephones typically have displays. It can be challenging to incorporate display structures into an electronic device. If care is not taken, electronic device display structures will be undesirably bulky or may have performance problems associated with display robustness, color uniformity, electrostatic discharge protection, and component integration.

It would therefore be desirable to be able to provide improved display structures in electronic devices.

SUMMARY

An electronic device may have a housing such as a metal housing. A display such as a liquid crystal display may be mounted within the housing. A groove may separate the housing from the display. A gasket may be mounted within the groove. The gasket may be formed from an elastomeric material. A recess in the gasket may be configured to receive an edge of the display. The gasket may have protrusions such as a lower protrusion that is attached to the housing of the electronic device with adhesive and an upper protrusion that covers an edge portion of the surface of the display. A portion of the gasket may contain an embedded stiffener such as a metal stiffening structure.

Corner brackets formed from sheet metal members may be installed in the corners of the housing. The housing may have inner and outer concentric ribs. Recesses in the housing may be configured to receive the corner brackets. The recesses may be formed between the inner and outer concentric ribs.

Gap filling structures may be interposed between a rear housing wall in an electronic device housing and a display backlight unit associated with a display. A gap filling structure may be formed from plastic member or a layer of foam.

Variations in the color of display pixels in a display such as temperature-induced color cast variations may be corrected by using a backlight unit having an array of light-emitting diodes of different colors. The array of light-emitting diodes may contain groups of diodes that are yellower or are otherwise colored differently than adjacent diodes.

An electrostatic discharge protection layer such as a layer of indium tin oxide on a color filter layer may be grounded to a housing using conductive tape. A radio-frequency shielding can may be shorted to the conductive tape using a layer of conductive foam.

Black display edge coatings and adhesive-based structures for mounting a display to a housing may be used to block stray light within a device such as stray light produced by a backlight unit for a display.

A camera module or other optical component may be aligned with a camera window region in a display. The camera window may be formed from a circular hole or other opening in an opaque masking layer that is formed in an inactive area of a display. The camera window may lie between inner and outer concentric rings of sealant. The sealant may be used to laterally confine liquid crystal material within the display. An outer ring of sealant may surround the inner ring of sealant.

The display may have a color filter layer and a thin-film transistor layer. The liquid crystal material may be formed in a layer between the color filter layer and the thin-film transistor layer. To prevent display layers such as the color filter layer and thin-film transistor layer from bowing in the region of the display between the inner and outer rings of sealant, support structures may be formed that connect the color filter layer and thin-film transistor layer between the inner and outer rings of sealant. The support structures may include a layer of clear adhesive in the vicinity of the camera window region.

Further features of the invention, its nature and various advantages will be more apparent from the accompanying drawings and the following detailed description of the preferred embodiments.

DETAILED DESCRIPTION

Electronic devices such as notebook computers, tablet computers, cellular telephones, media players, televisions, and other electronic equipment may be provided with displays.

Figure 1:
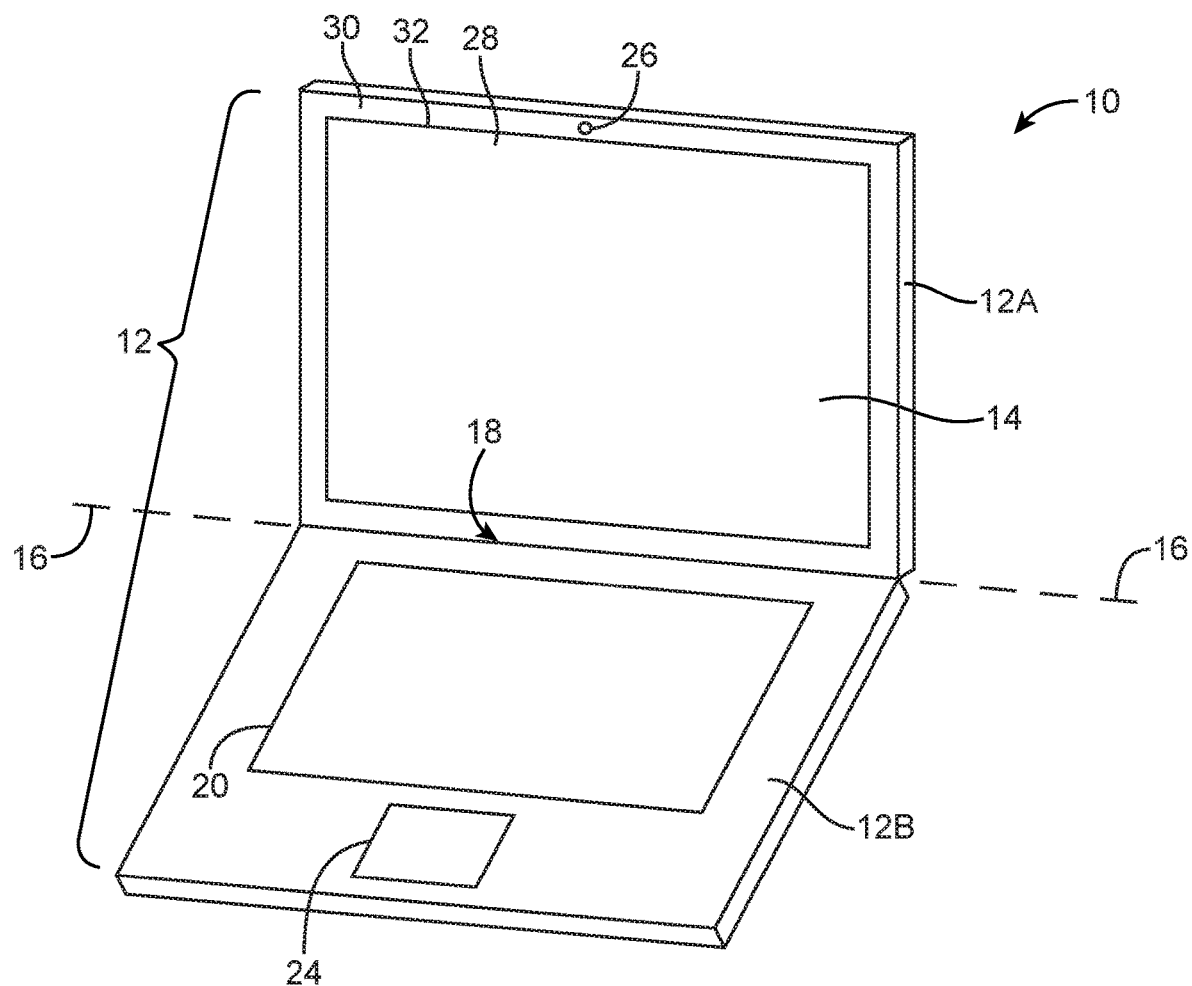
FIG. 1 is a perspective view of an illustrative electronic device in accordance with an embodiment of the present invention.

An illustrative electronic device such as a portable computer or other electronic equipment that has a display is shown in FIG. 1. As shown in FIG. 1, display 14 of device 10 may be mounted in housing 12. Housing 12 may be formed from a single housing structure or may, as shown in FIG. 1, have multiple attached structures such as upper housing portion 12A and lower housing portion 12B. In this type of configuration, display 14 may be mounted in upper housing portion 12A (as an example).

Housing 12 may be formed from a unibody construction in which some or all of housing 12 is formed form a unitary piece of material (e.g., metal, plastic, or fiber composite materials) or may be formed from multiple structures that have been mounted together using adhesive, fasteners, and other attachment mechanisms. For example, housing 12 may be formed from frame members and other internal supports to which external plates, housing sidewalls, bezel structures, and other structures are mounted. Hinge structures 18 may be used in attaching housings formed from multiple housing portions such as upper housing portion 12A and lower housing portion 12B.

Housing portion 12A may be used to house display 14 and may sometimes be referred to as a display housing or lid. Display housing 12A may be attached to housing portion 12B (sometimes referred to as a main unit or base housing) using hinge structures 18, so that display housing 12A may rotate relative to main housing 12B around hinge axis 16. Device 10 may include ports for removable media, data ports, keys such as keyboard 20, input devices such as track pad 24, microphones, speakers, sensors, status indicators lights, and other components. If desired, device 10 may have a camera such as camera 26.

Display 14 may have an active portion such as active central rectangular portion 28 and an inactive portion such as inactive portion 30. Active portion 28 of display 14 may have a shape such as a rectangular shape bounded by line 32 of FIG. 1. Inactive portion 30 of display 14 may have a rectangular ring shape or other suitable shape and may form a border that runs along the periphery of display 14. Display pixel array elements such as liquid crystal diode display pixels or other active display pixel structures may be used in portion 28 to present images to a user of device 10. Inactive portion 30 is generally devoid of display pixels and does not participate in forming images for a user. To hide unsightly internal components from view, internal components in inactive portion 30 may be blocked from view by incorporating a black masking layer or other opaque masking layer into the peripheral portion of display 14.

Display 14 may be a liquid crystal display, an electrophoretic display, an electrowetting display, a plasma display, an organic light-emitting diode display, or a display formed using other display technologies. Illustrative configurations for device 10 in which display 14 has been formed using liquid crystal display technologies are sometimes described herein as an example. This is, however, merely illustrative. Display 14 may, in general, be formed using any suitable type of display structures.

Device 10 may have components that are formed in inactive display region 30 such as camera 26. Camera 26 may be mounted within display housing 12A and may operate through a window (sometimes referred to as a camera window) in display 14. The camera window may be created by forming a circular opening or an opening with another suitable shape in the layer of opaque masking material in region 30.

Housings 12A and 12B may be formed from materials such as metal (as an example). To prevent undesired contact between the exposed inner faces of housings 12A and 12B when housing 12 has been placed in a closed-lid position, an elastomeric material (sometimes referred to as an elastomeric gasket) may be formed on a portion of housing 12 such as housing 12A. An elastomeric gasket may, as an example, have a rectangular ring shape so that the gasket runs along line 32 of FIG. 1 around the periphery of display 14. The elastomeric gasket may protrude from housing 12A so the elastomeric gasket forms a soft bumper structure that prevents housings 12A and 12B from directly rubbing against each other when housing 12A has been placed in a closed position.

Figure 2:
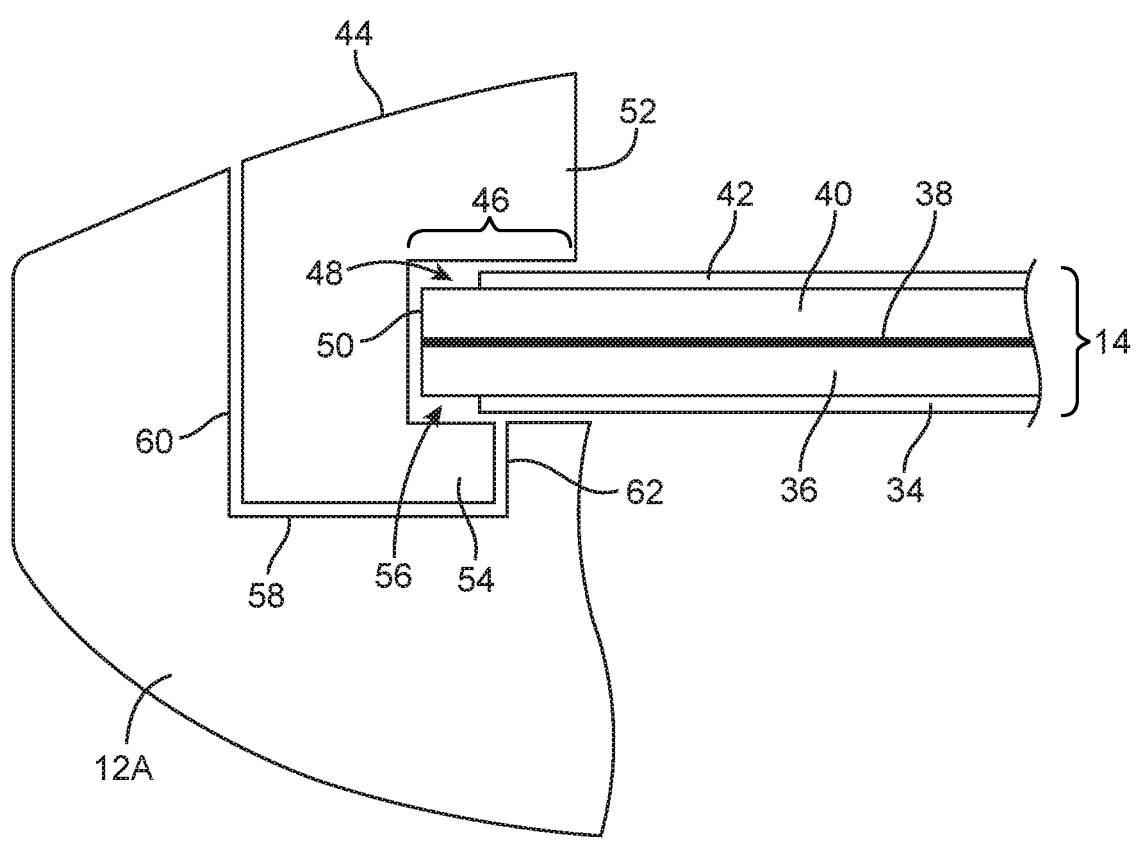
FIG. 2 is a cross-sectional side view of a portion of a display mounted in an electronic device housing using an elastomeric gasket in accordance with an embodiment of the present invention.

A cross-sectional side view of device 10 in the vicinity of a portion of an elastomeric gasket is shown in FIG. 2. As shown in FIG. 2, display 14 may include multiple display layers such as lower polarizer layer 34, thin-film transistor layer 36, color filter layer 40, and upper polarizer layer 42. A layer of liquid crystal material such as liquid crystal layer 38 may be interposed between thin-film transistor layer 36 and color filter layer 40. Thin-film transistor layer 36 may have an array of electrodes and associated thin-film transistors. The electrodes and thin-film transistors may be used in controlling the application of electric fields to liquid crystal layer 38 to adjust the orientation of liquid crystals in layer 38. In conjunction with upper and lower polarizers 34 and 42, control of the electric fields in layer 38 may be used to adjust the transmission of the display pixels in display 14 and thereby present images on display 14 for a user of device 10. Color filter layer 40 may include an array of color filter elements that provide display 14 with the ability to display color images.

Gasket 44 may be formed from a pliable (flexible) material such as an elastomeric polymer (e.g., silicone). Gasket 44 may have a recess such as recess 56 that is configured to receive edge 50 of display 14. Recess 56 may be formed between protrusion 52 on the upper portion of gasket 44 and protruding portion 54 on the lower portion of gasket 44. Protruding portions 52 and 54 and recess 56 may be configured so that gasket 44 has a C-shaped cross section for receiving edge 50, as shown in FIG. 2.

The layers of display 14 may not all be aligned in the vicinity of edge 50. For example, upper polarizer 42 may be recessed from edge 50, so that an exposed strip of color filter layer 40 is formed such as exposed strip 48. The presence of upper protruding portion 52 of gasket 44 may hide region 46 of display 14 from view, thereby blocking unsightly features such as exposed color filter strip 48 from view by a user of device 10.

Figure 3:
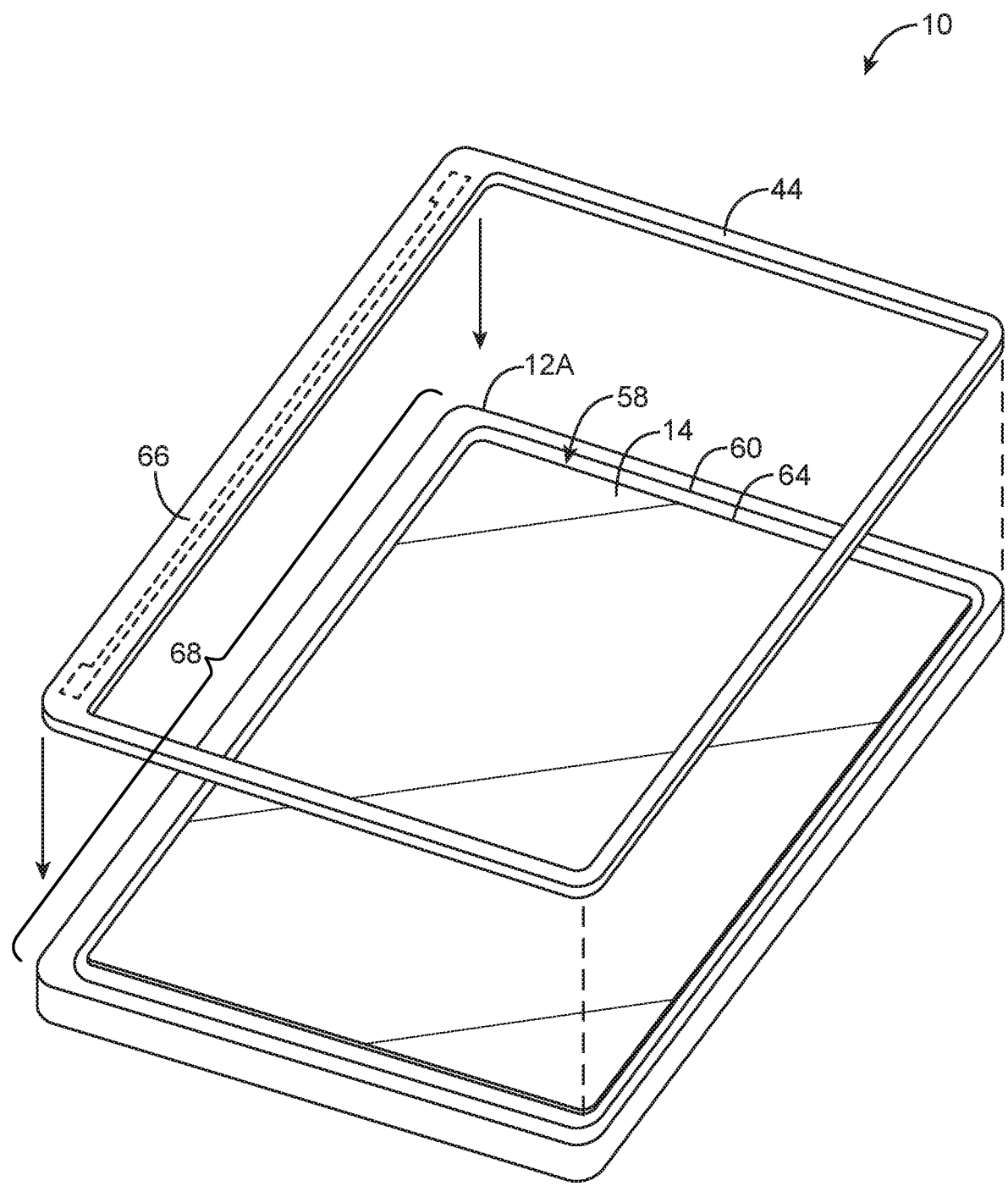
FIG. 3 is a perspective view of an illustrative elastomeric gasket with an embedded stiffener in accordance with an embodiment of the present invention.

Housing 12A may have a groove such as groove 58 that is configured to receive gasket 44. Groove 58 may have an outer edge such as edge 60 and an inner edge such as edge 62. As shown in the exploded perspective view of housing 12A of FIG. 3, groove 58 may have a rectangular ring shape and may lie between inner groove edge 60 and outer edge 64 of display 14. Along edge 68 of display 14, gasket 44 may have an associated stiffener such as stiffener 66. Stiffener 66 may, for example, be embedded within the elastomeric material that forms gasket 44. Stiffener 66 may be formed from metal, fiber-based composites, or other stiff materials. As an example, stiffener 66 may be formed from a patterned sheet metal layer such as a layer of stainless steel or aluminum or other metal member configured to add stiffness to gasket 44 along edge 68 of display 14 and thereby facilitate assembly operations. Stiffener 66 may be attached to gasket 44 using adhesive or stiffener 66 (e.g., a patterned sheet metal member) may be incorporated into gasket 44 by molding elastomeric material for gasket 44 over stiffener 66 (e.g., using compression molding equipment or injection molding equipment).

Figure 4:
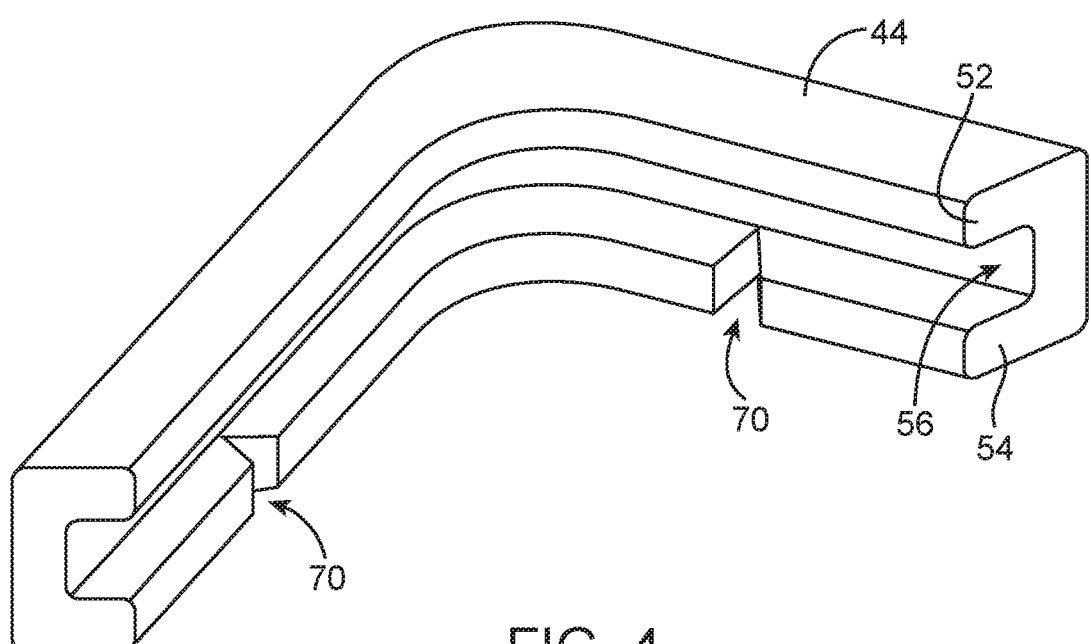
FIG. 4 is a perspective view of an illustrative portion of an elastomeric gasket in accordance with an embodiment of the present invention.

FIG. 4 is a perspective view of a portion of a corner portion of gasket 44. As shown in FIG. 4, gasket 44 may include notches such as notches 70 (e.g., in protruding lower edge portion 54). The presence of notches 70 in gasket 44 may help provide gasket 44 with flexibility during installation of gasket 44 in groove 58 and/or may help align gasket 44 with housing 12A.

Figure 5:
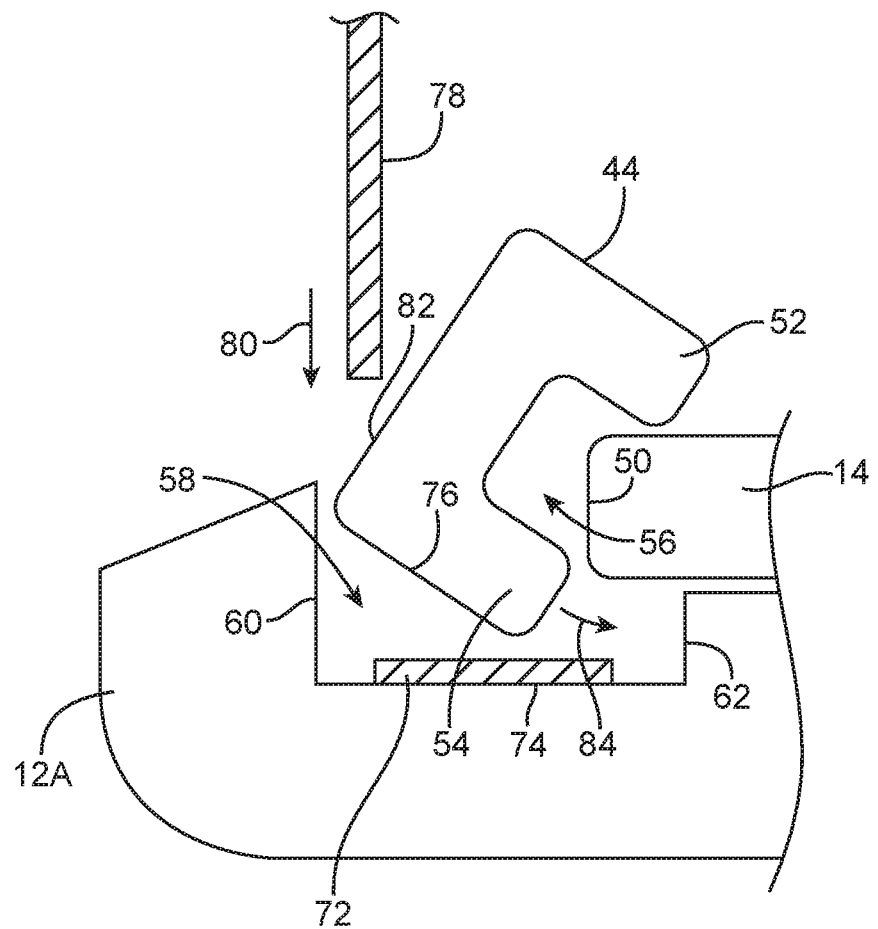
FIG. 5 is a cross-sectional side view of an illustrative elastomeric gasket and associated assembly tool showing how the gasket may be installed within a groove between a display and electronic device housing in accordance with an embodiment of the present invention.

FIG. 5 is a cross-sectional side view of groove 58 showing how adhesive 72 may be placed on lower surface 74 of groove 58. Adhesive 72 may be a pressure sensitive adhesive or other adhesive for attaching gasket 44 within groove 58. During installation of gasket 44, a user or computer-controlled equipment may press tool 78 against portion 82 of gasket 80 in directions such as direction 80, thereby causing gasket 44 to rotate so that portion 54 of gasket 44 moves into groove 58 in direction 84 and so that edge 50 of display 14 is received within gasket recess 56 and so that surface 76 of gasket 44 lies on adhesive 72.

Figure 6:
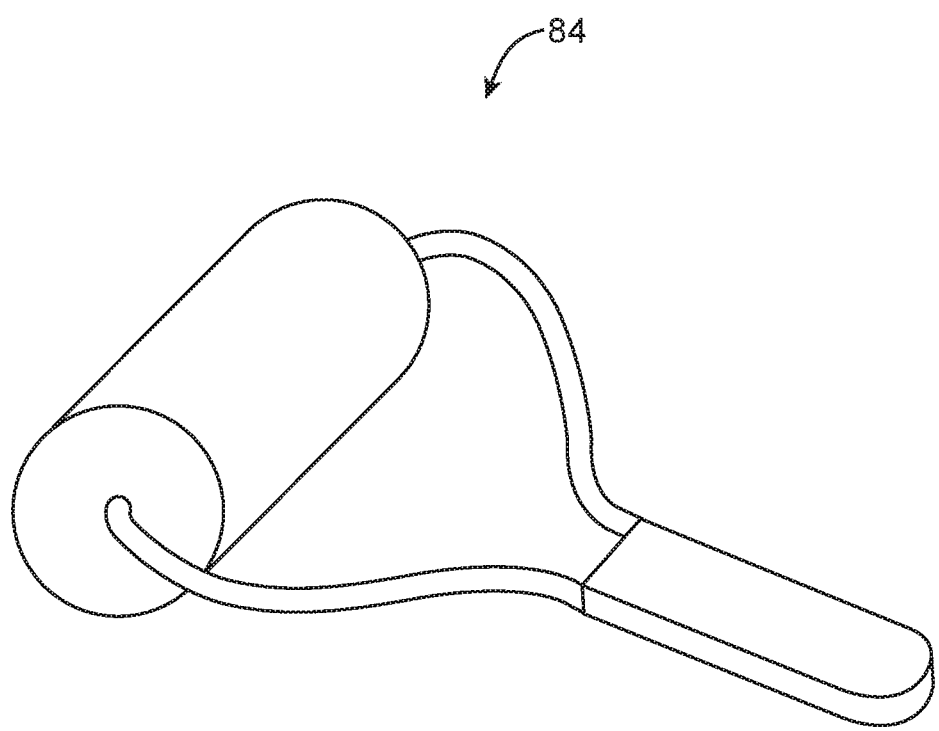
FIG. 6 is a perspective view of an illustrative roller for installing an elastomeric gasket in an electronic device in accordance with an embodiment of the present invention.

A tool such as roller 84 of FIG. 6 may also be used in installing gasket 44 within groove 58 between housing 12A and display 14.

Figure 7:
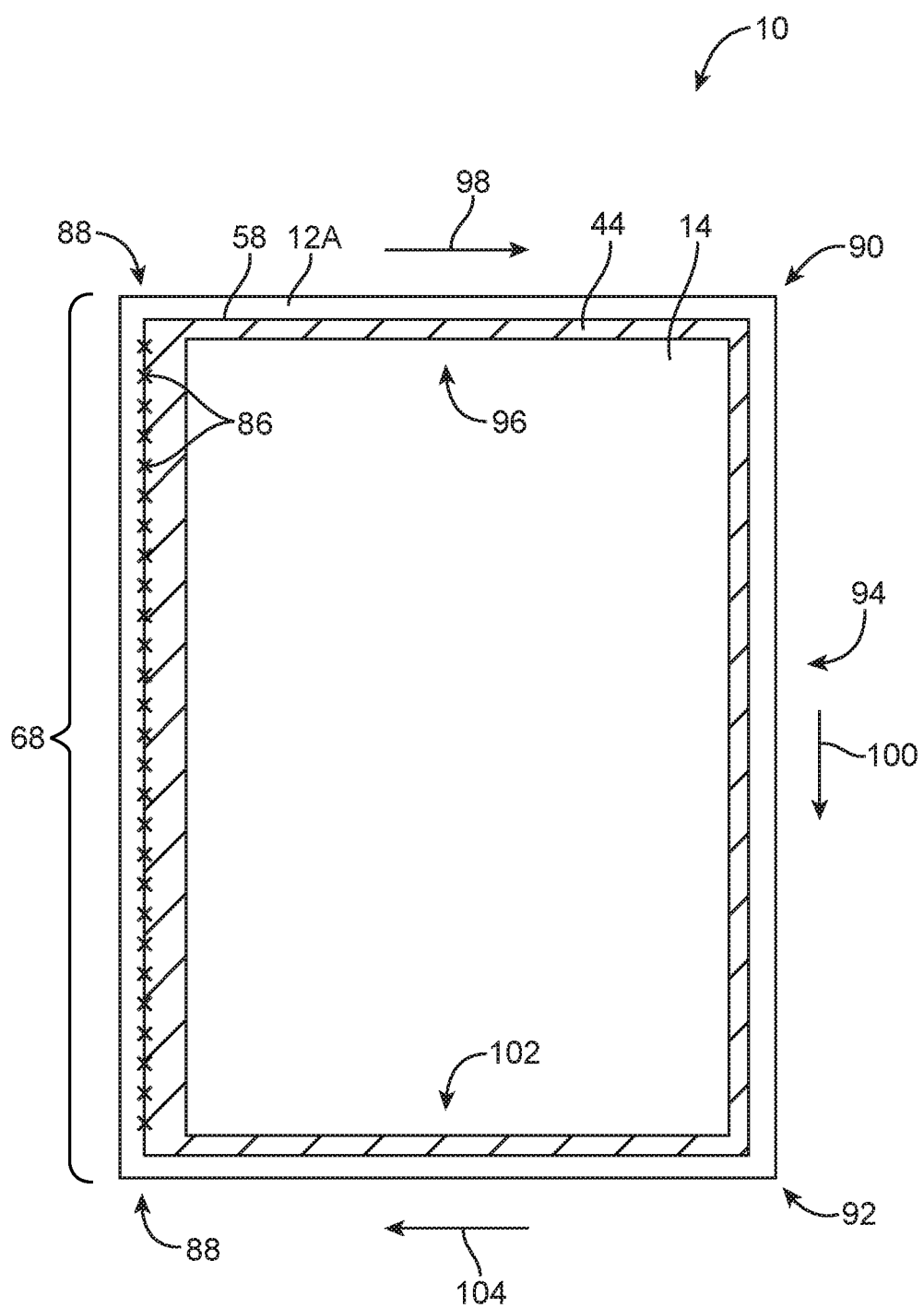
FIG. 7 is a top view of a portion of an electronic device showing how an elastomeric gasket with an embedded stiffener may be installed within an electronic device housing around the periphery of the display in accordance with an embodiment of the present invention.

FIG. 7 is a top view of housing 12A showing how gasket 44 may be taped to housing 12A along edge 68 using tape 86. Following attachment of gasket 44 to housing 12A using tape, assembly personnel or computer-controlled equipment may tuck gasket 44 into grove 58 (e.g., first tucking gasket 44 into corners 88, second tucking gasket 44 into corner 90, third tucking gasket 44 into corner 92, and fourth tucking gasket 44 into groove 58 along edge 94). Following these gasket tucking operations, a roller such as roller 84 of FIG. 6 may be used to roll the remainder of gasket 44 into groove 58 by rolling along edge 96 in direction 98, along edge 94 in direction 100, and along edge 102 in direction 104 (as an example). Other types of assembly operations may be used to install gasket 44 in groove 58 of housing 12A, if desired. The use of corner and edge tucking operations (e.g., using a tool such as tool 78) followed by use of roller 84 is merely illustrative.

Figure 8:
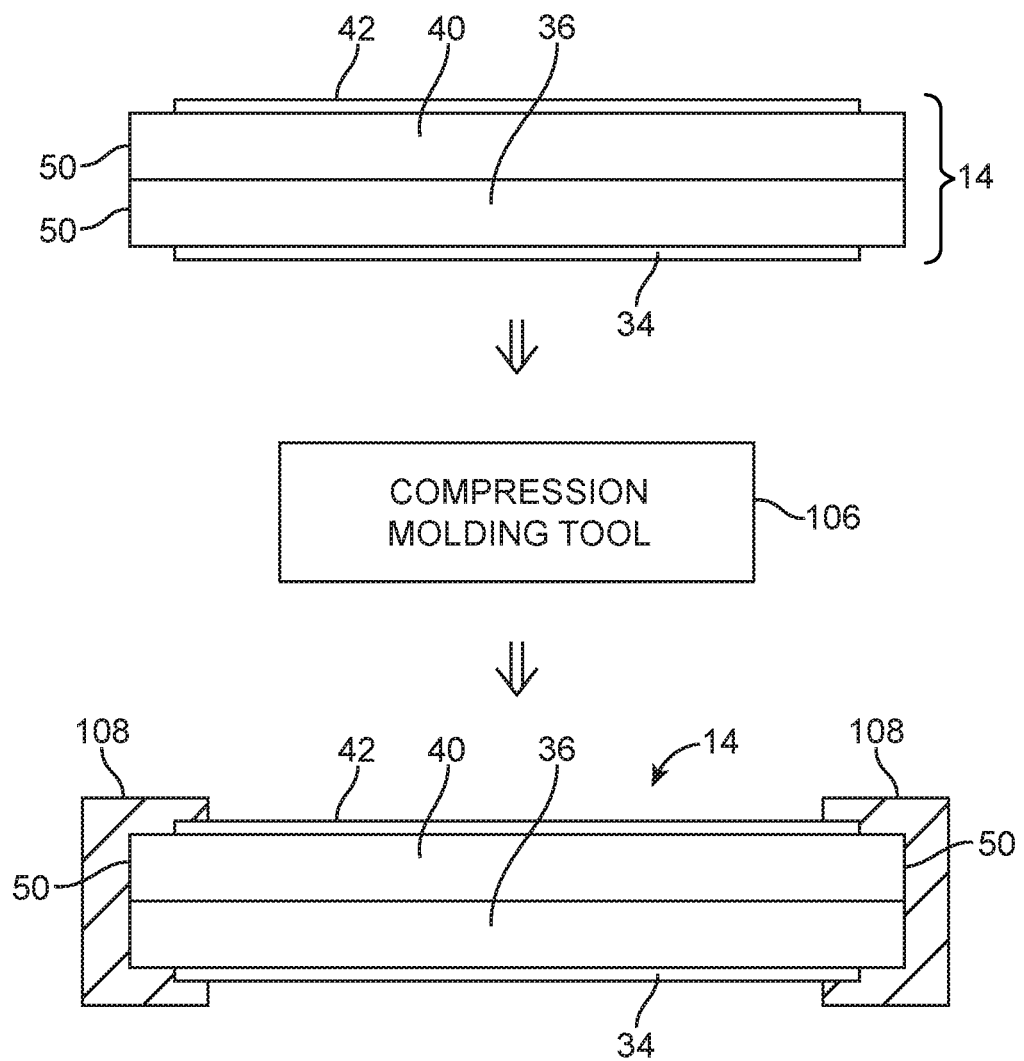
FIG. 8 is a cross-sectional side view of display structures and an associated polymer molding tool showing how an elastomeric gasket may be molded to the peripheral edges of the display structures in accordance with an embodiment of the present invention.

If desired, elastomeric gasket material may be attached to display 14 using molding equipment (e.g., compression molding tools, injection molding tools, etc.). As shown by display 14 in the upper portion of FIG. 8, for example, display 14 may initially be formed without any gasket material on edges 50. Integral peripheral gasket 108 may then be formed by molding an elastomeric polymer over edges 50 using compression molding tool 106 or other plastic molding equipment, as shown in the lower portion of FIG. 8. Following attachment of gasket 108 to display 14, display 14 may be installed in housing 12A.

Housings 12A and 12B may be formed from a metal such as aluminum. To structurally reinforce the corners of housing 12 (e.g., housing 12A), housing 12A may be provided with corner brackets such as corner bracket 110 of FIG. 9. Corner brackets such as corner bracket 110 may be provided at each of the four corners of housing 12A (as an example). Corner brackets such as corner bracket 110 may be formed from a material such as a stainless steel that is stronger than aluminum and which therefore adds structural strength to housing 12A. The additional strength provided by corner brackets 110 may help device 10 avoid damage (e.g., to display 14) when a corner of device 10 strikes an external object during an unintentional drop event. Each corner bracket may be formed from a planar sheet metal member and may have opposing surfaces such as upper surface 111 and lower surface 113, surrounded by peripheral edge 115.

Figure 9:
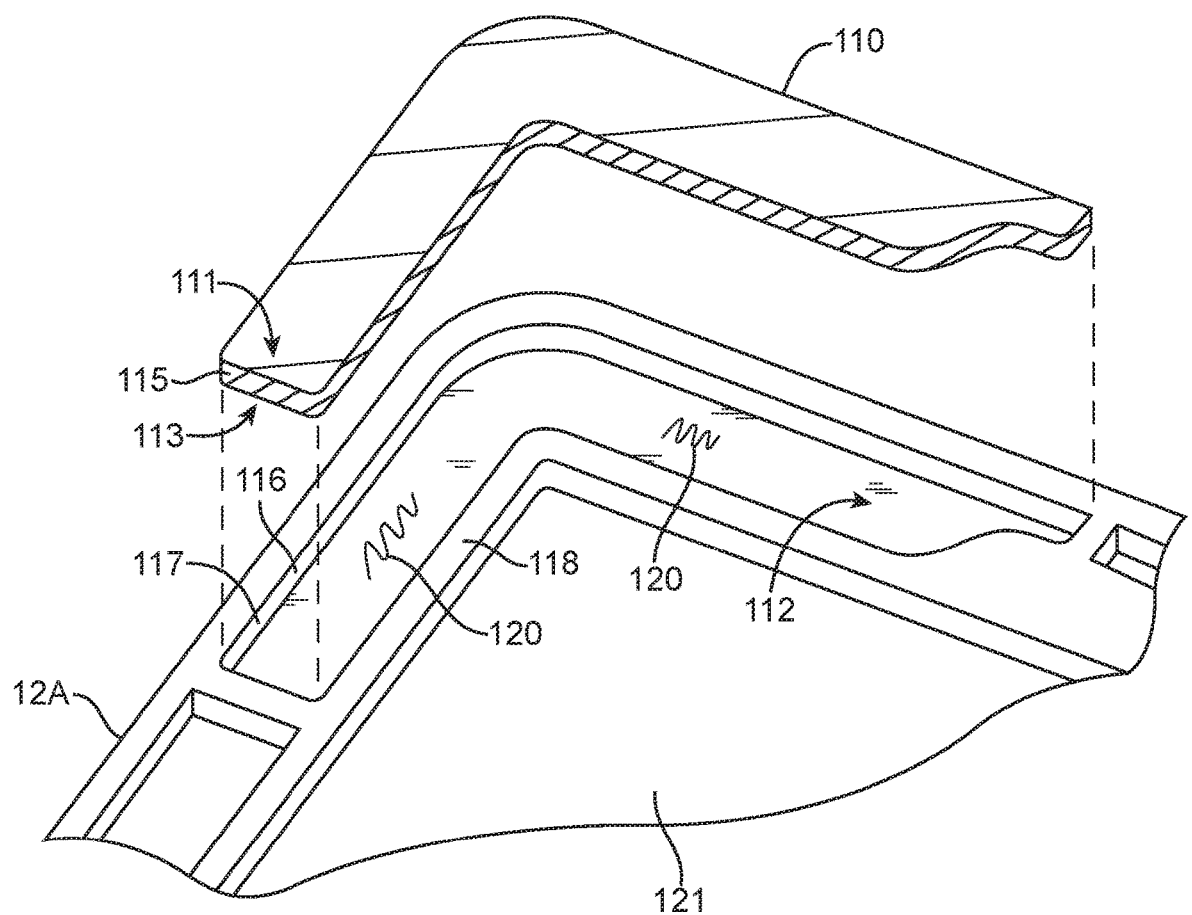
FIG. 9 is a perspective view of an electronic device housing with a recess that receives and surrounds a corner bracket in accordance with an embodiment of the present invention.

As shown in FIG. 9, housing 12A may have a rear surface such as rear surface 121. Raised edge portions such as inner rib 118 and outer rib 116 may surround a rectangular center portion of rear housing wall 121. When fully assembled, display 14 may be cover inner rib 118 and outer rib 116. Portions of inner rib 118 and outer rib 116 may be configured to form corner recesses such as corner recess 112. Corner recess 112 may have a shape that is configured to receive corner bracket 110. Adhesive-based attachment structures 120 or other suitable fastening mechanisms may be used to help retain corner bracket 110 within corner recess 112, if desired.

Corner recess 112 may have a planar surface that is configured to mate with lower surface 113 of corner bracket 110. Adhesive 120 may be interposed between surface 113 and the surface of recess 112. The surface of recess 112 may be surrounded by inner recess edge 117. The shape of edge 117 may be configured to match the shape of edge 115, so that edge 117 may receive edge 115 and corner bracket 110. When bracket 110 is mounted within housing 12A, housing 12A may surround bracket 110 on all sides (e.g., peripheral edge 115 of bracket 110 may be surrounded by portions of housing 12A along edge 117).

Figure 10:
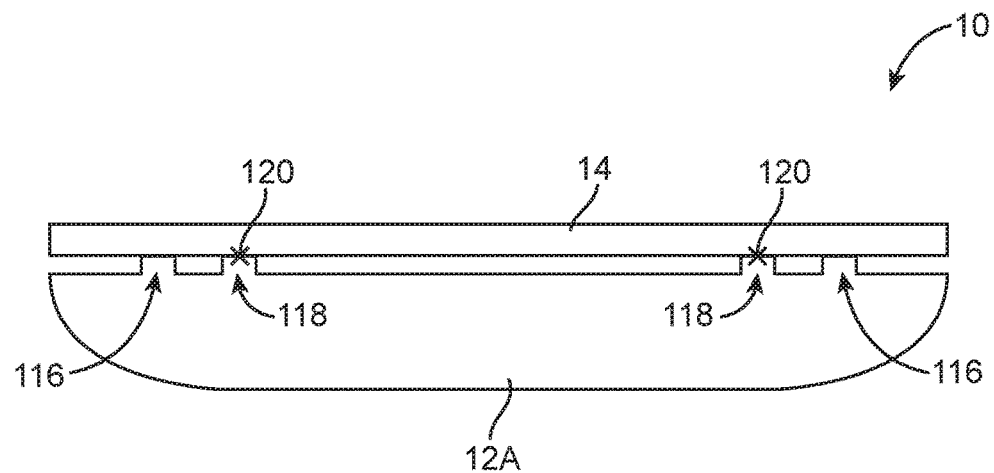
FIG. 10 is a cross-sectional side view of an electronic device having a housing that is in an unflexed condition in accordance with an embodiment of the present invention.
Figure 11:
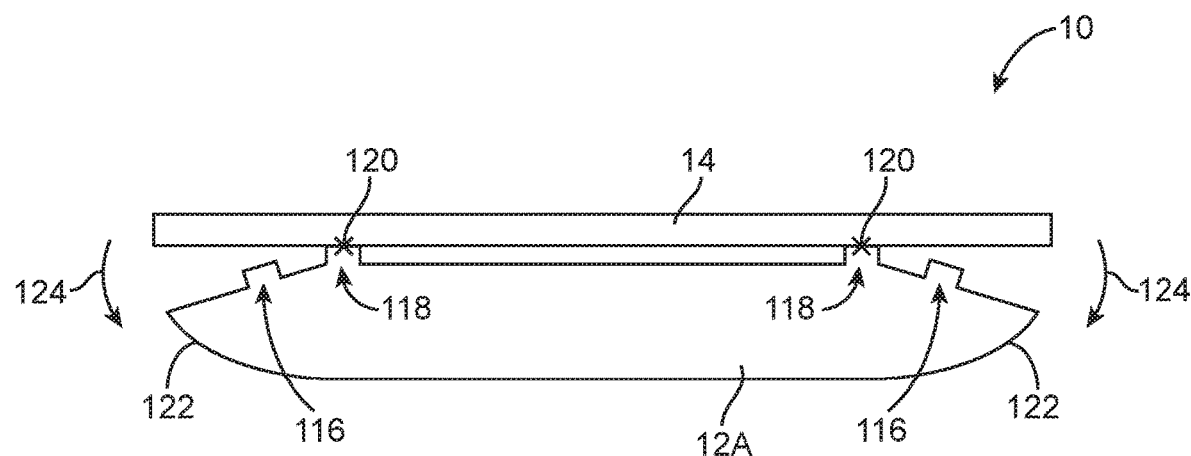
FIG. 11 is a cross-sectional side view of the electronic device of FIG. 10 in a configuration in which the housing has been flexed in accordance with an embodiment of the present invention.

FIG. 10 is a side view of device 10 showing how display 14 may be attached to display housing 12A using an adhesive-based structure on inner rib 118 (e.g., a rectangular ring of adhesive-based materials). In the configuration of FIG. 10, device housing 12A has not been subjected to a drop event and is therefore unflexed and planar. If dropped, device housing 12A may flex, so that edge portions 122 of housing 12A move in directions 124 away from display 14. By locating adhesive-based attachment structures on inner ribs 118 but not on outer ribs 116 (i.e., so that outer ribs 116 are free of adhesive), downward force from ribs 116 pulling on display 14 can be eliminated, thereby reducing stress on display 14 and helping to avoid damage to display 14 in a drop event.

Figure 12:
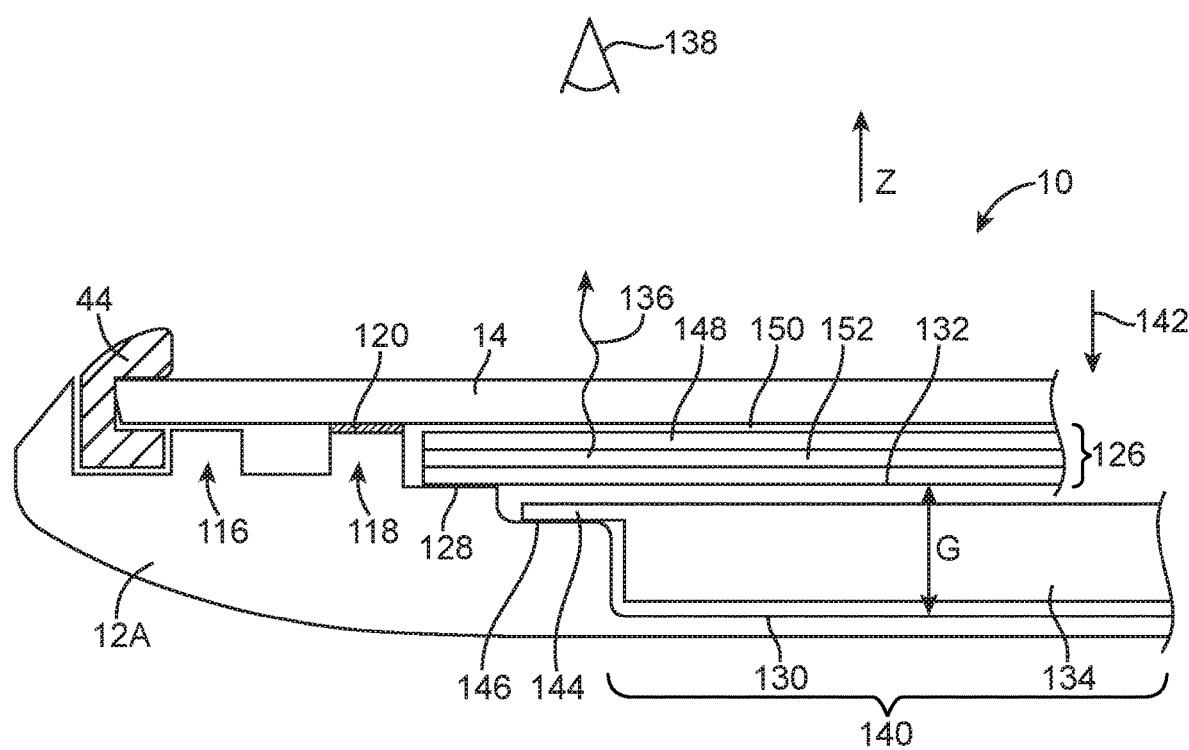
FIG. 12 is a cross-sectional side view of an illustrative electronic device having a gap-filling structure interposed between display backlight structures and housing structures in accordance with an embodiment of the present invention.

FIG. 12 is a cross-sectional side view of device 10 showing how display 14 may be provided with backlight illumination using backlight unit 126. Backlight unit 126 may include light guide plate 148, optical films 150, and reflector 152. When backlight unit 126 is operating, backlight 136 may travel in direction Z through display 14 so that user 138 may view backlit images on display 14. Backlight unit 126 may be mounted on a ledge such as ledge 128 of housing 12A. In region 140, the shape of housing 12A may be configured so that there is a gap G between lower (innermost) surface 132 of backlight unit 126 (i.e., the lower surface of reflector 152) and upper (innermost) surface 130 of the rear housing wall in housing 12A. The size of gap G may be, for example, 1-10 mm, 1-5 mm, less than 4 mm, less than 2 mm, 0.5 to 3 mm, or other suitable size.

During use of device 10, housing 12A and display 14 may be subjected to drop events and other forces that may cause display 14 to bow downward in direction 142. To prevent lower surface 132 of backlight unit 126 (i.e., the lower surface of reflector 152) from incurring damage by contacting inner surface 130 of display housing 12A, a gap filling structure such as gap filing structure 134 may be interposed between backlight unit 126 and the rear housing wall formed by the portion of housing 12A in region 140. Gap filling structure 130 may have the shape of a rectangle (when viewed in direction 142) and may have a footprint that approximately matches that of backlight unit 126. Examples of materials that may be used for forming gap filling structure 134 (sometimes referred to as a dome filler) are plastic, foam, structures that includes one or more layers of plastic and/or foam, plastic structures with cavities separated by ribs, etc. Gap filling structure 126 may have a lip such as lip 144 that rests on ledge 146 in housing 12A or may be formed from a rectangular structure (e.g., a rectangular sheet of foam).

Figure 13:
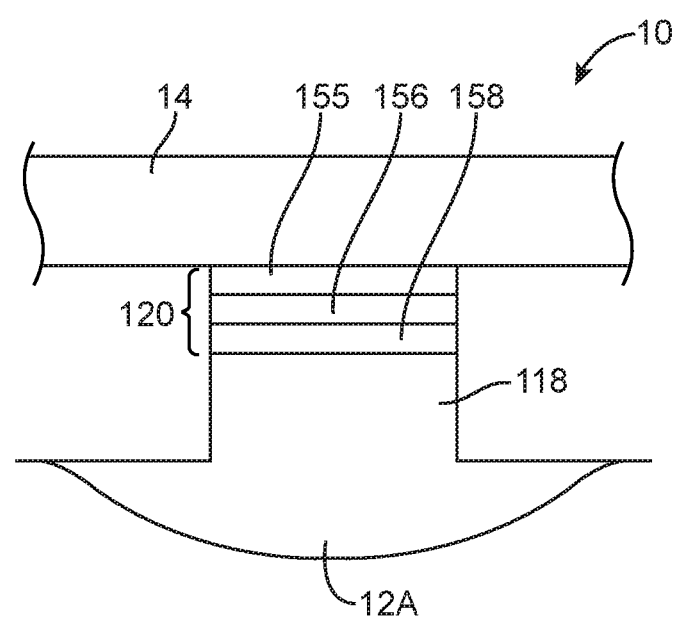
FIG. 13 is a cross-sectional side view of an adhesive and foam structure that may be used in attaching a display to a housing in accordance with an embodiment of the present invention.

FIG. 13 is a cross-sectional side view of display 14 in device 10 in the vicinity of adhesive-based attachment structure 120. As shown in FIG. 13, adhesive-based structure 120 may include multiple layers of material such as black adhesive layer 155, black foam layer 156, and black adhesive layer 158. Due to the presence of foam layer 156, structures 120 may become compressed during an impact event or other stress-producing event, thereby relieving stress from display 14. By using opaque materials in forming adhesive-based attachment structures 120, light from display 14 (e.g., stray backlight from display backlight unit 126) may be blocked, thereby reducing light leakage in device 10.

Figure 14:
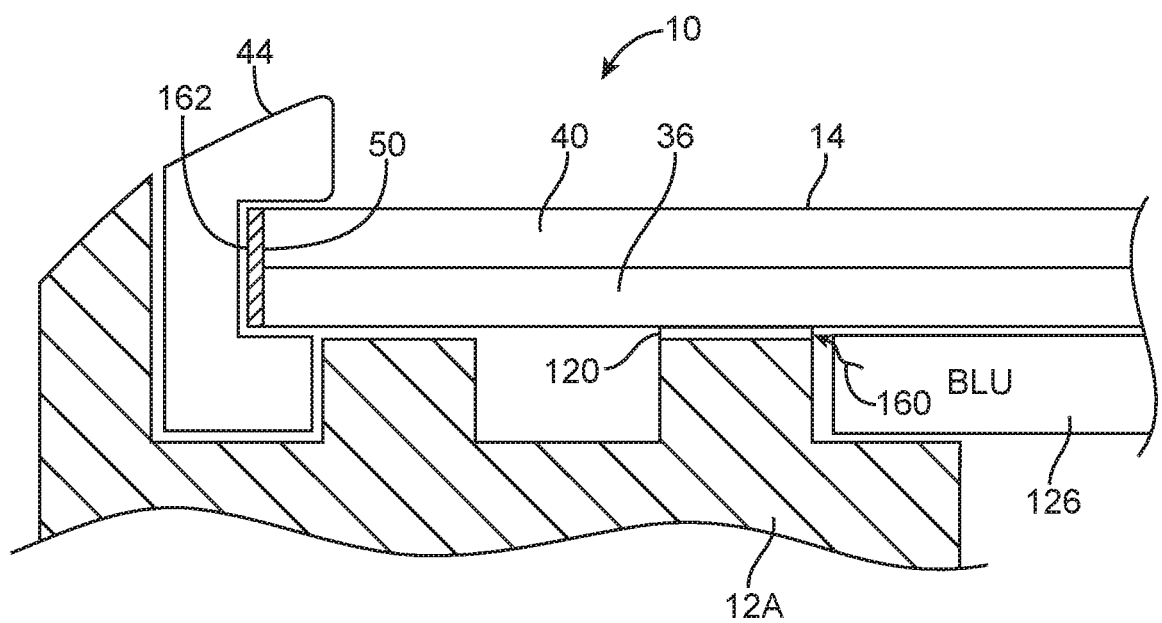
FIG. 14 is a cross-sectional side view of a portion of an electronic device in which an adhesive-based structure such as the adhesive and foam structure of FIG. 13 has been used in attaching a display to the electronic device in accordance with an embodiment of the present invention.

As shown in FIG. 14, for example, backlight unit 126 may emit stray light 160. Adhesive-based attachment structure 120 may be formed from black layers of material or other opaque materials that block light 160 and thereby help reduce stray light in display 14 and device 10. Some stray light may reach the edges of display 14 by traveling through display layers such as color filter layer 40 and thin-film transistor layer 36. When this stray light reaches edge 50 of display 14, there is a potential that surface roughness on edge 50 will cause the stray light to be scattered out of display edge 50 into locations that might be visible to a user of device 10. To reduce the emission of stray light from edge 50, edge 50 may be coated with an opaque material such as material 162. Material 162 may coat edge 50 without coating adjacent exposed upper and lower surfaces of display 14 (as shown in FIG. 14) or may, if desired, cover parts of the nearby upper and lower surface of display 14. Light-blocking coating 162 may be formed from ink (e.g., black ink) or other opaque materials.

Figure 15:
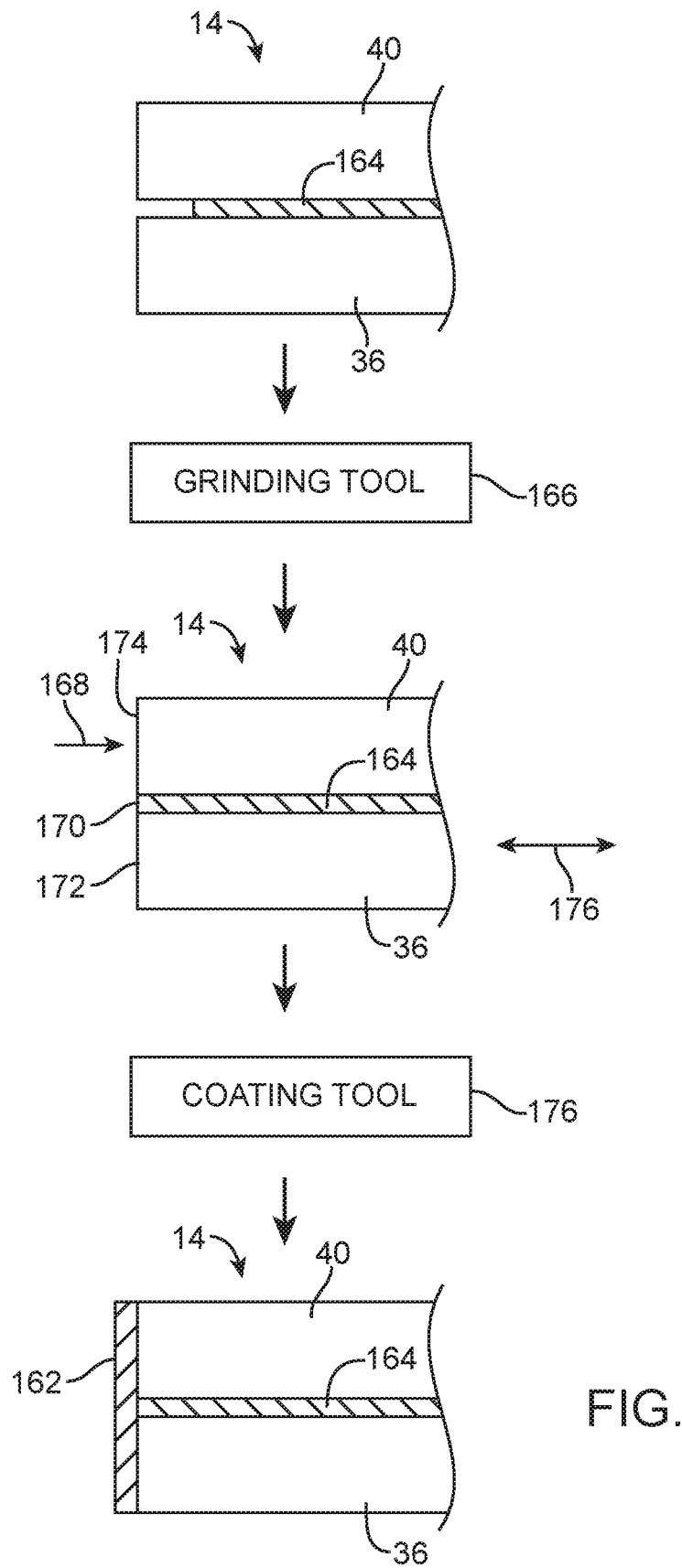
FIG. 15 is a diagram showing how a light-blocking layer may be formed on the ground edge of a display in accordance with an embodiment of the present invention.

An illustrative process for forming light-blocking structure 162 on edge 50 of display 14 is shown in FIG. 15. As shown in FIG. 15, an opaque masking layer such as masking layer 164 (e.g., a black masking layer) may be interposed between color filter layer 40 and thin-film transistor layer 36 near the edge of display 14 (e.g., in inactive region 30). As initially formed as part of the process of attaching layers 40 and 36 to each other, the outer edge of opaque masking layer 164 may not be aligned with the edges of color filter layer 40 and thin-film transistor layer 36. Display layers such as layers 40 and 36 may be formed from transparent substrate materials such as plastic or glass. Using grinding equipment such as grinding tool 166, the exposed edges of display 14 may be ground until exposed color filter edge 174, exposed opaque masking layer edge 170, and thin-film transistor edge 172 are aligned relative to lateral dimension 176 (which lies in the plane of display 14). Coating tool 176 may then be used to deposit an opaque coating on the edge of display 14 to form light-blocking structure 162. In a rectangular display with four edges, light-blocking coatings such as light-blocking structure 162 of FIG. 15 may be formed on all four edges of display 14 or on a subset of the four edges of display 14.

Figure 16:
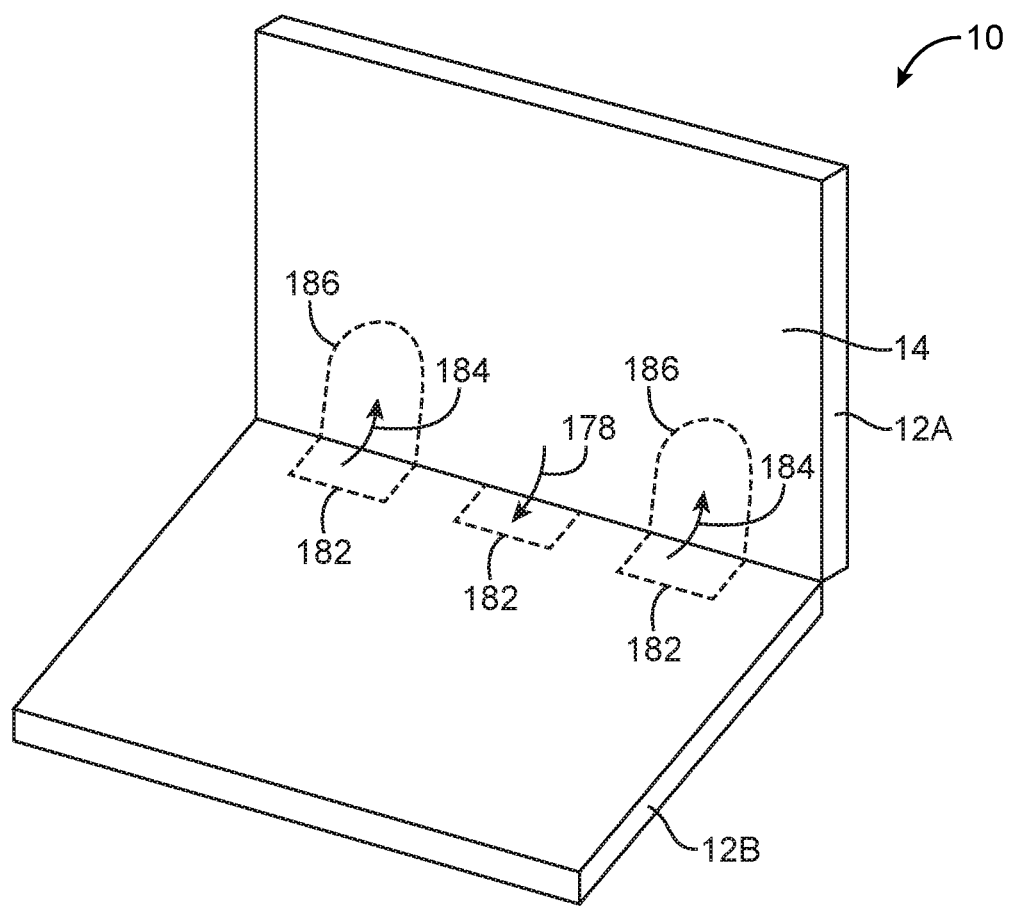
FIG. 16 is a perspective view of an illustrative electronic device having a display that may be characterized by different operating temperatures in different regions in accordance with an embodiment of the present invention.

Housing 12B may contain components that generate heat such as a microprocessor, video chips, communications circuits, memory, application-specific integrated circuits, power supply components, and other circuitry. This circuitry may be cooled using circulated air. As an example, housing 12B may contain fan-based cooling structures such as structures 182 that draw cool air 178 into housing 12B from the surrounding environment and that expel corresponding heated air 184. As shown in FIG. 16, heated air 184 may tend to heat regions 186 of display 14 more than other regions of display 14. This may tend to affect the color performance of display 14. In particular, in the absence of corrective action, the display pixels and therefore the image content on display 14 in heated areas such as heated areas 186 may have a bluish color cast relative other areas of display 14.

To compensate for the excessively blue color of the display pixels in regions such as regions 186 that are experiencing elevated temperatures during operation of device 10, display 14 may be backlit using an array of light-emitting diodes of different colors such as yellowish light-emitting diodes and white light-emitting diodes. The backlight unit in display 14 may also be provided with a light guide plate scattering pattern that helps scatter backlight out of display 14 in a pattern that directs an enhanced amount of yellowish light through regions 186 and thereby compensates for the bluish color in regions 186.

Figure 17:
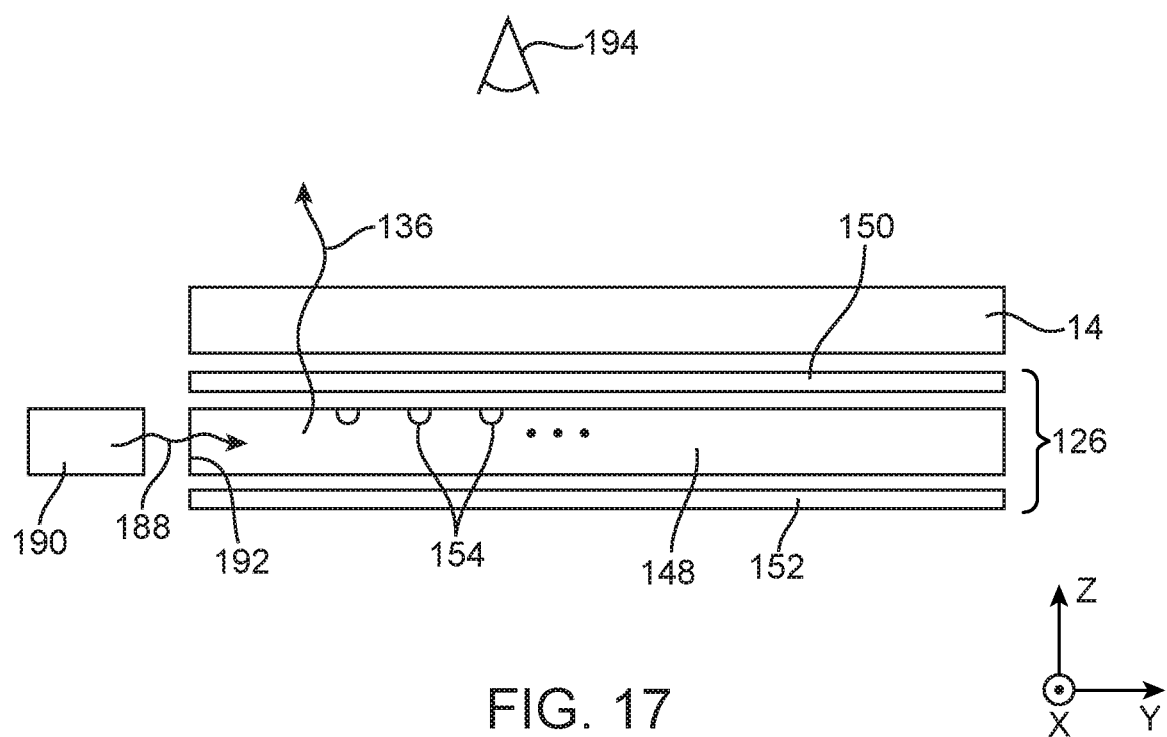
FIG. 17 is a cross-sectional side view of an illustrative display with backlight structures in accordance with an embodiment of the present invention.

A cross-sectional side view of a backlight arrangement of the type that may be used in display 14 is shown in FIG. 17. As shown in FIG. 17, light 188 may be generated by a light source such as light source 190. Light 188 may be launched into edge 192 of light guide plate 148. Light guide plate 148 may be formed from transparent plastic (as an example). Light 188 may be distributed throughout light guide plate 148 in the X-Y plane due to the principal of total internal reflection. Light that scatters from features such as light-scattering features 154 may propagate upwards in direction Z as backlight 136. Backlight 136 may pass through display 14 and may help user 194 view images on display 14. A reflective layer such as reflector 152 may reflect light that has scattered downwards back in upwards direction Z, thereby enhancing backlight efficiency. Optical films 150, which may be interposed between light guide plate 148 and display 14 may include a diffusing layer and light-collimating layer (as examples).

Light source 190 may be formed from an array of light-emitting diodes mounted on a flexible printed circuit or other substrate. The array of light-emitting diodes may extend along edge 192 of light guide plate 148 in dimension X. To help compensate display 14 for temperature-induced color variations or other location-based color variations, the color of the light-emitting diodes may be varied as a function of dimension X. The light scattering efficiency of light-scattering structures 154 may also be varied as a function of location in display 14 (i.e., dimensions X and Y). Light-scattering structures 154 may, as an example, be formed from pits in the surface of light guide plate 148 (e.g., laser-etched pits having a diameter of about 10-16 microns). To adjust the light scattering efficiency of light-scattering structures 154, the density of light-scattering structures 154 (i.e., the number of structures 154 per unit area), the size of light-scattering structures 154, and/or the shape of light-scattering structures 154 may be varied.

Figure 18:
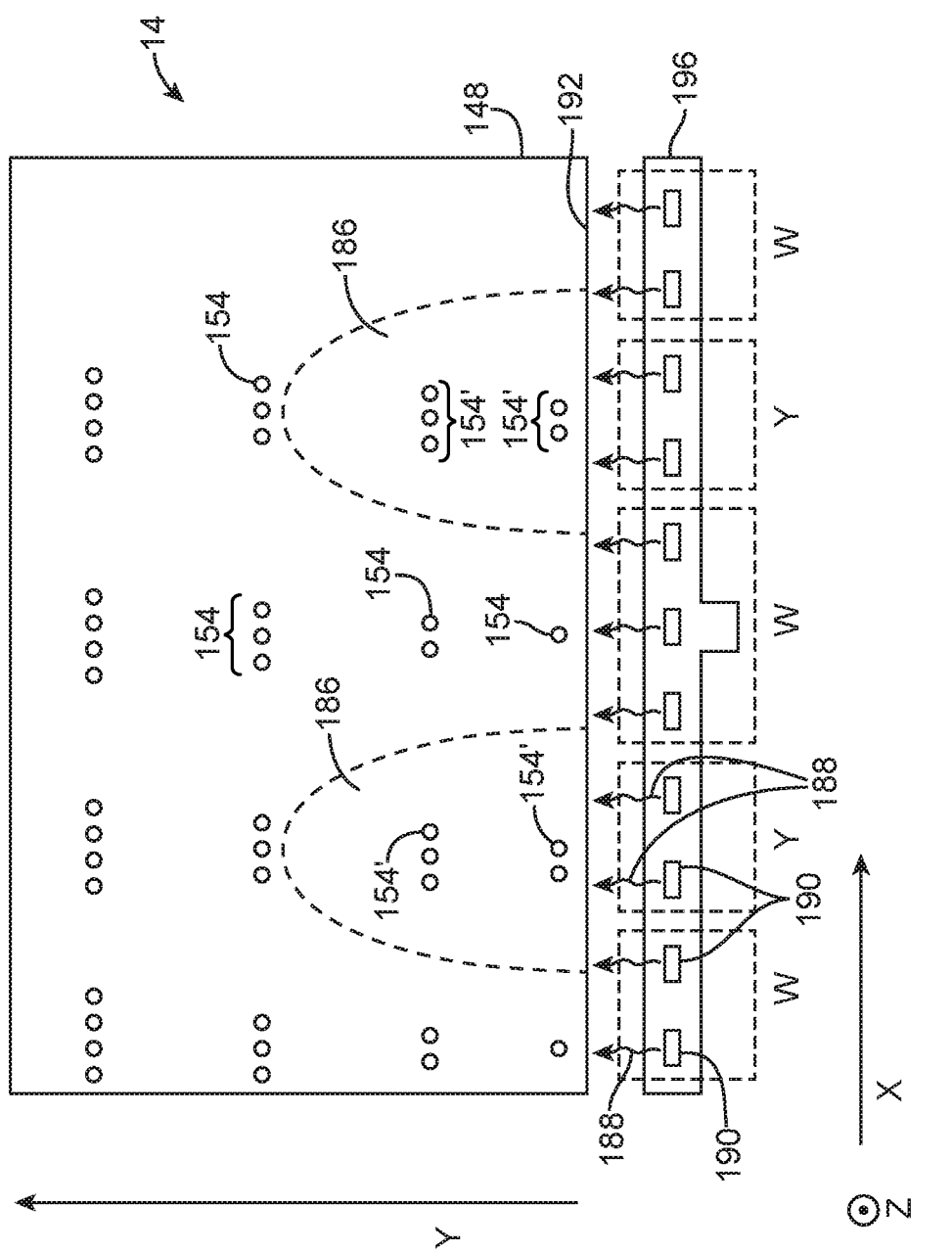
FIG. 18 is a top view of display structures including a light guide plate with light scattering structures configured to help compensate for spatially varying color characteristics in the display structures in accordance with an embodiment of the present invention.

FIG. 18 is a top view of display 14 showing how light-emitting diodes 190 may be organized in a line parallel to edge 192 of light guide plate 148. Light-emitting diodes 190 may be mounted on a substrate such as flexible printed circuit 196 (e.g., a sheet of polyimide or a layer of other flexible polymer). Light-emitting diodes 190 may emit light 188 that is coupled into edge 192 of light guide plate 148. When traveling through light guide plate 148, light 188 will be scattered in dimension Z by light-scattering structures 154 to serve as backlight for display 14.

As shown in FIG. 18, different light-emitting diodes 190 may be provided with different colors. In particular the light-emitting diodes labeled "W" may emit light that is white, whereas the groups of light-emitting diodes labeled "Y" may emit light that is more yellow than the light-emitting diodes labeled "W". The white emitting diodes labeled "W" (i.e., the light-emitting diodes that are adjacent to the groups of yellow light-emitting diodes) may be aligned (in dimension X) with portions (i.e., vertically extending regions) of display 14 that are not elevated in temperature and that therefore operate satisfactorily with normal (e.g., white-light) illumination.

In regions 186, the operating temperature of display 14 is elevated, which causes the display pixels to tend to exhibit light with a bluish color. To compensate for the overly-blue tendencies of the display pixels in regions 186, light-emitting diodes 190 that are aligned (in dimension X) with elevated temperature regions 186 (i.e., the "Y" light emitting diodes of FIG. 18) may emit light that is yellowish relative to the light emitted by the white light-emitting diodes. The presence of yellowish light 188 in regions 186 will tend to counteract the inherent bluish cast of the display pixels in regions 186 due to the elevated temperature in regions 186.

There is generally a decrease in light intensity for light 188 as a function of distance Y into light guide plate 148. To counteract this light intensity drop-off, light-scattering structures 154 may be provided with a light-scattering efficiency that increases with increases in dimension Y. This increase in light-scattering efficiency as a function of increasing Y value is illustrated by the enhanced density of light-scattering structures 154 with increases in dimension Y in FIG. 18. Within regions 186, extra yellow light may be scattered towards the viewer to compensate for the bluish color cast of the display pixels in regions 186 by providing light-scattering structures 154' in regions 186 with more light scattering efficiency than comparable light-scattering structures 154 (i.e., light-scattering structures 154 in laterally adjacent portions of display 14). With this configuration, more efficiency is provided to light-scattering structures 154' in regions 186 than structures 154 that are located at the same location in dimension Y but that are offset in dimension X so as to fall outside of regions 186. As a result of using a pattern of light-scattering structures that exhibit localized increases in light-scattering efficiency, luminance (light intensity) may not be completely uniform on display 14. Nevertheless, because the human eye is more sensitive to color variations than luminance variations, the use of compensating light-emitting diode colors and light-scattering structures 154' with locally enhanced light-scattering efficiencies tends to improve perceived display performance.

Figure 19:
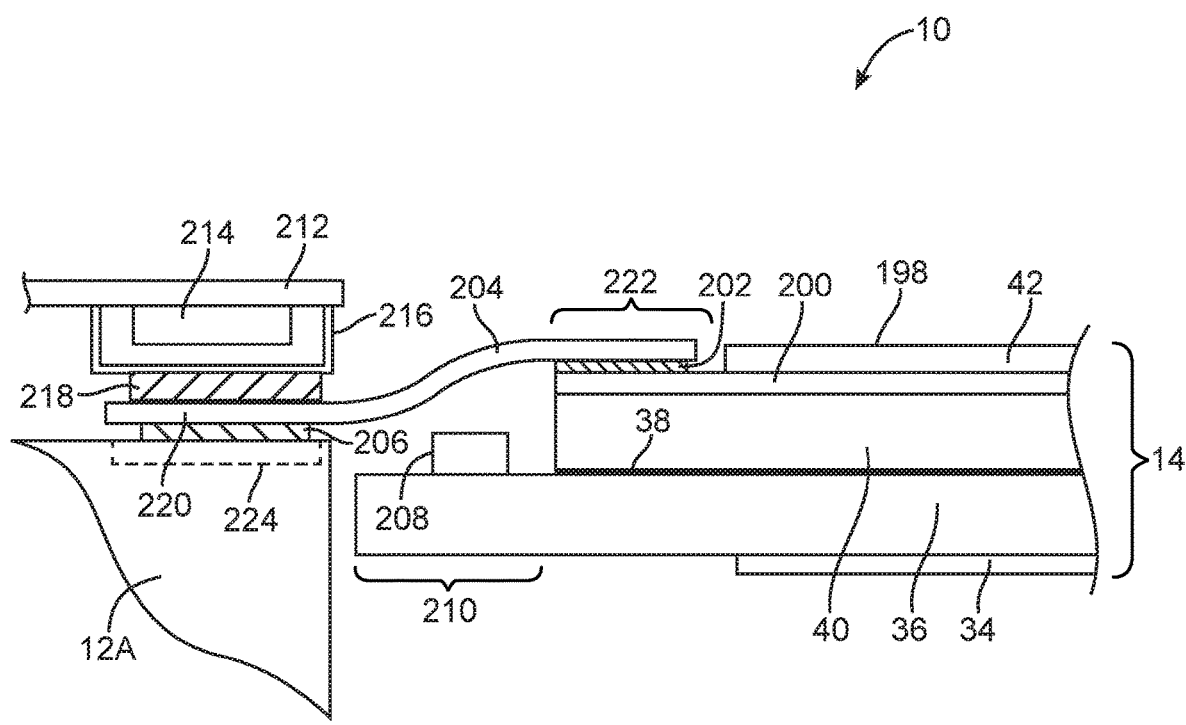
FIG. 19 is a cross-sectional side view of an illustrative display having a conductive tape structure for grounding an electrostatic discharge protection layer to a housing in accordance with an embodiment of the present invention.

Display 14 may include a conductive layer such as a layer of indium tin oxide (ITO) for providing protection from damage due to electrostatic discharge events. When a finger of a user or other external object comes into contact with the outer surface of display 14 such as outer surface 198 of display 14 of FIG. 19, there is a risk for undesired static charge accumulation that could disrupt the electric fields within liquid crystal layer 38. Conductive layer 200 (e.g., an indium tin oxide layer or other transparent conductive electrostatic discharge protection layer) may be used to prevent events of this type from disrupting display operation. As shown in FIG. 19, conductive layer 200 may be interposed between upper polarizer layer 198 and color filter layer 40.

In edge region 222, a strip of conductive layer 200 may be exposed (i.e., not covered with polarizer layer 198). This allows a conductive path to be formed between conductive layer 200 and a source of ground such as metal housing structure 12A. Conductive layer 204 may be, for example, a layer of metal tape. Conductive adhesive 202 may be used to attach conductive tape 204 to conductive layer 200 in region 222. Conductive adhesive 206 may be used to attach portion 220 of conductive tape structure 204 to housing 12A. Housing 12A may, if desired, be formed from a metal that has an insulating coating such as aluminum covered with an insulating coating of aluminum oxide. As shown in FIG. 19, laser etching or machining operations may be used to create uncoated region 224 on housing 12A to ensure that oxide or other insulating materials do not degrade the quality of the electrical connection formed between portion 220 of structure 204 and housing 12A. If desired, fasteners, welds, connectors, or other electrical attachment mechanisms may be used in forming electrical connections between the ends of conductive tape structure 204 and conductive structure 200 and housing 12A. The use of conductive adhesive in forming these connections in the configuration of FIG. 19 is merely illustrative.

Thin-film transistor layer 36 may have a portion such as thin-film transistor ledge 210 that is uncovered by color filter layer 40. Display driver integrated circuits such as circuit 208 may be mounted on ledge 210. Ancillary display circuits such as display circuit 214 may be mounted on other substrates such as printed circuit 212. Printed circuit 212 may be a rigid printed circuit board (e.g., a layer of fiberglass-filled epoxy) or may be a flexible printed circuit (e.g., a printed circuit formed from a flexible sheet of polyimide or other flexible polymer). Radio-frequency electromagnetic signal shielding structures such as metal shielding can 216 may be grounded to ground traces on printed circuit 212 and may be used to cover and shield circuitry 214. Conductive foam 218 may be interposed between shield can 216 and conductive tape structure 204. As shown in FIG. 19, can 216 may be shorted to portion 220 of structure 205 using conductive foam 218.

Figure 20:
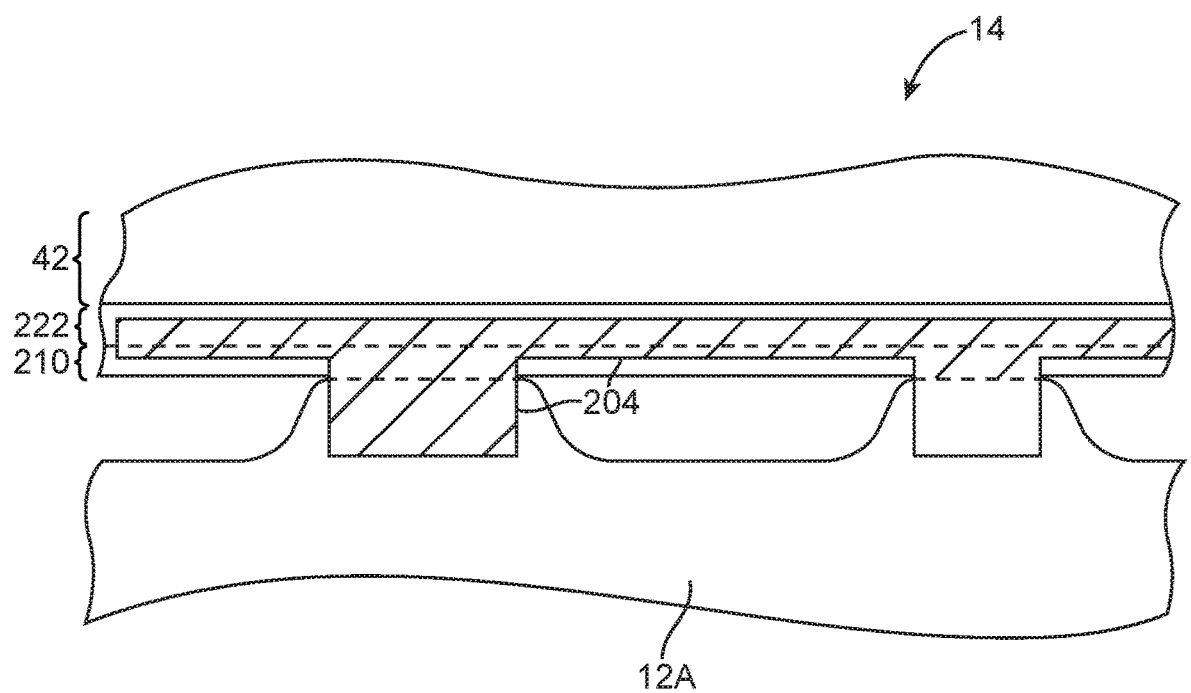
FIG. 20 is a top view of an edge portion of a display that is being shorted to a housing structure using a conductive tape structure in accordance with an embodiment of the present invention.

A top view of conductive tape structure 20 of FIG. 19 is shown in FIG. 20.

Figure 21:
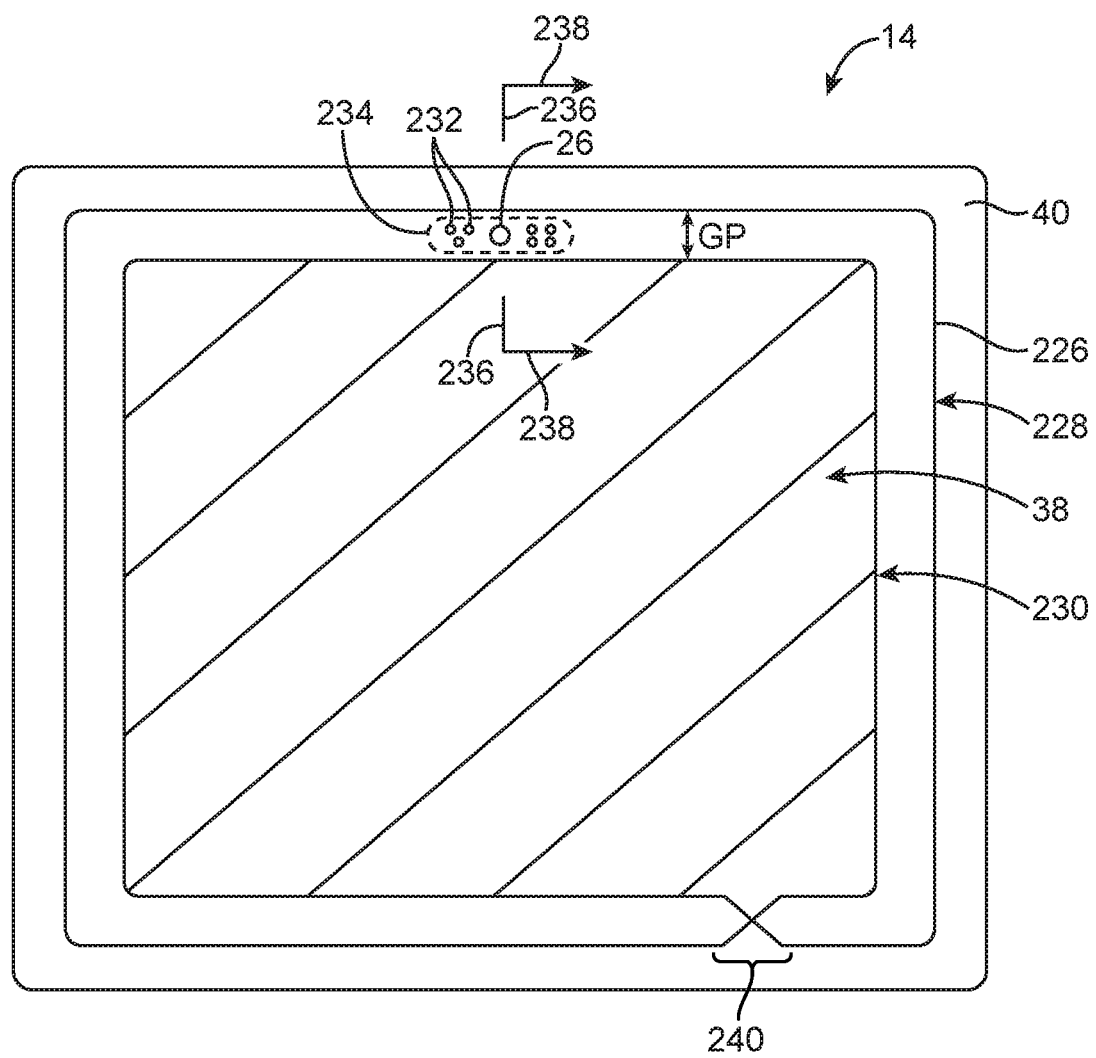
FIG. 21 is a diagram showing how a display may have multiple concentric beads of sealant and may have a camera window in accordance with an embodiment of the present invention.

FIG. 21 is a front view of display 14 showing how rings of sealant may be used in sealing liquid crystal material 38 within display 14. As shown in FIG. 21, a bead of sealant such as sealant bead 226 may run around the periphery of display 14 between color filter layer 40 and thin-film transistor layer 36. The bead of sealant may have a cross-over region such as region 240, so that a single line of sealant may form inner and outer concentric rings of sealant such as outer ring 228 and inner ring 230. By using sealant 226, liquid crystal material 38 may be laterally sealed within the cavity formed between color filter layer 40 and thin-film transistor layer 36. The layer of liquid crystal material that is interposed between color filter layer 40 and thin-film transistor layer 36 may have a thickness of about 3-5 microns, about 1-10 microns, more than 3 microns, less than 5 microns, or other suitable thickness.

Liquid crystal material 38 may be confined within the rectangular region defined by sealant structures 226 (i.e., inner sealant ring 230 may run along the periphery of rectangular liquid crystal material layer 38 in active display region 28). A gap such as gap GP may be formed between outer ring 228 and inner ring 230. Gap GP may be free of active display pixels (i.e., gap GP may lie in inactive display region 30) and may or may not contain liquid crystal material.

To prevent display layers such as color filter layer 40 and thin-film transistor layer 36 bowing in gap region GP and thereby forming undesired Newton's rings that may be visible to a user, a support structure such as a structure formed from a supportive layer of material may be formed in regions such as region 234 (and if desired, in other portions of gap GP running around the periphery of display 14). The supportive layer of material in region 234 (and, if desired, other portions of gap GP between rings 228 and 230) may be formed from a layer of adhesive.

Spacers 232 may have a defined height in dimension Z (e.g., 3-5 microns or other suitable height). When color filter layer 40 and thin-film transistor layer 36 are attached to each other, spacers 232 (which may also be formed in the array of display pixels for display 14 within liquid crystal material 38) may ensure that the spacing between layer 40 and layer 36 has a well-defined thickness during the introduction of the layer of adhesive in liquid form. Spacers 232 may be formed from columns of polymer (e.g., columns of polyimide patterned using photolithography).

The adhesive may be a clear ultraviolet-light-curable liquid adhesive that flows between layers 40 and 36 around spacers 232. The liquid adhesive may be cured by applying ultraviolet light through thin-film transistor layer 36. Once cured, the clear liquid adhesive may become rigid and may fill the space between layers 40 and 36 with a solid support structure that prevents layers 40 and 36 from bowing relative to each other. Use of a clear material for the adhesive in region 234 may allow light for camera 26 or other optical components to pass through the adhesive.

Figure 22:
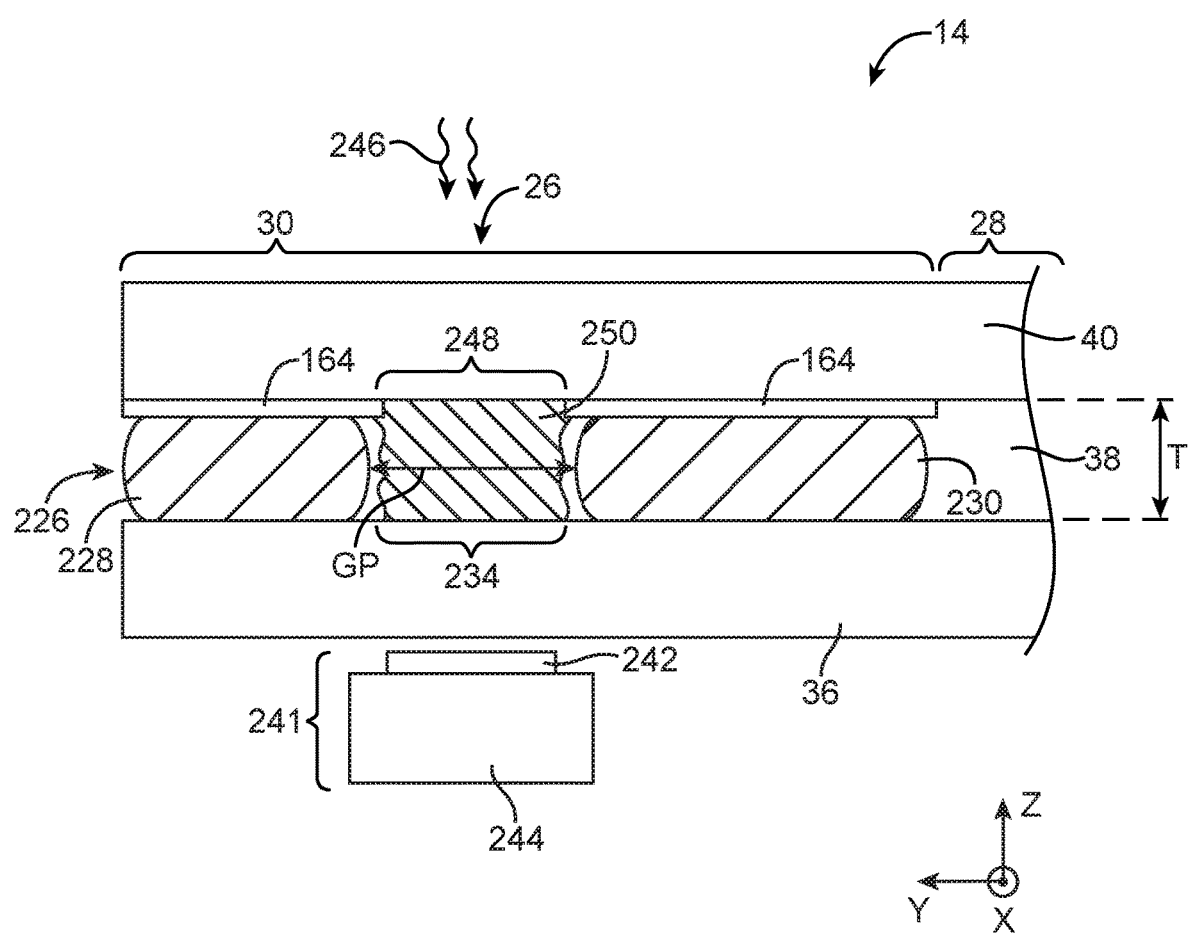
FIG. 22 is a cross-sectional side view of the display of FIG. 21 showing how adhesive may be incorporated into the display in the vicinity of the camera window to provide structural support for layers in the display in accordance with an embodiment of the present invention.

A cross-sectional side view of display 14 in the vicinity of camera 26 is shown in FIG. 22. The cross-sectional side view of FIG. 22 is taken along line 236 and is viewed in direction 238 of FIG. 21. As shown in FIG. 22, color filter layer 40 and thin-film transistor layer 36 may be separated by a thickness T (e.g., a thickness of 3-5 microns, 1-10 microns, more than 3 microns, less than 5 microns, or other suitable thickness). Liquid crystal material 38 may be interposed between color filter layer 40 and thin-film transistor layer 36 in active area 28. Sealant may prevent liquid crystal material 38 from escaping from the edges of display 14 in dimensions X and Y.

An opaque masking layer such as opaque masking layer 164 may be formed on the underside of color filter layer 40 in inactive region 30. Opaque masking layer 164 may block internal display structures from view by a user. For example, opaque masking layer 164 may block sealant rings 228 and 230 from view.

Camera 26 may include a camera module such as camera module 241 (sometimes referred to as a camera). Camera module 241 may have a digital image sensor such as image sensor 244 and lens structures 242. Lens structures 242 and image sensor 244 may be aligned with opening 248 in opaque masking layer 164, so that image light 246 for digital images may be captured by camera module 241. Opening 248 may sometimes be referred to as a camera window. The shape of opening 248 may be, for example, a circle that is aligned with a circular lens in lens structures 242.

Sealant rings 228 and 230 may be separated by a gap such as gap GP. To support color filter layer 40 and thin-film transistor layer 36 within gap GP, adhesive 250 may be interposed between color filter layer 40 and thin-film transistor layer 36 within gap GP. Adhesive 250 may be a clear adhesive that allows light 246 associated with an image to pass through gap GP to camera module 241. If desired, a keep-out zone (e.g., a circular region overlapping lens 242) may be used to prevent adhesive 250 from filling the portion of gap GP that lies directly above lens 242. In configurations of the type shown in FIG. 22 in which adhesive 250 fills substantially all of gap GP in the vicinity of camera module 241 (e.g., when adhesive 150 fills gap GP at least within region 234 of FIG. 21), adhesive 250 may serve as an index-matching structure that helps to reduce reflections from the surface of layers 40 and 36 and thereby improve camera performance.

Figure 23:
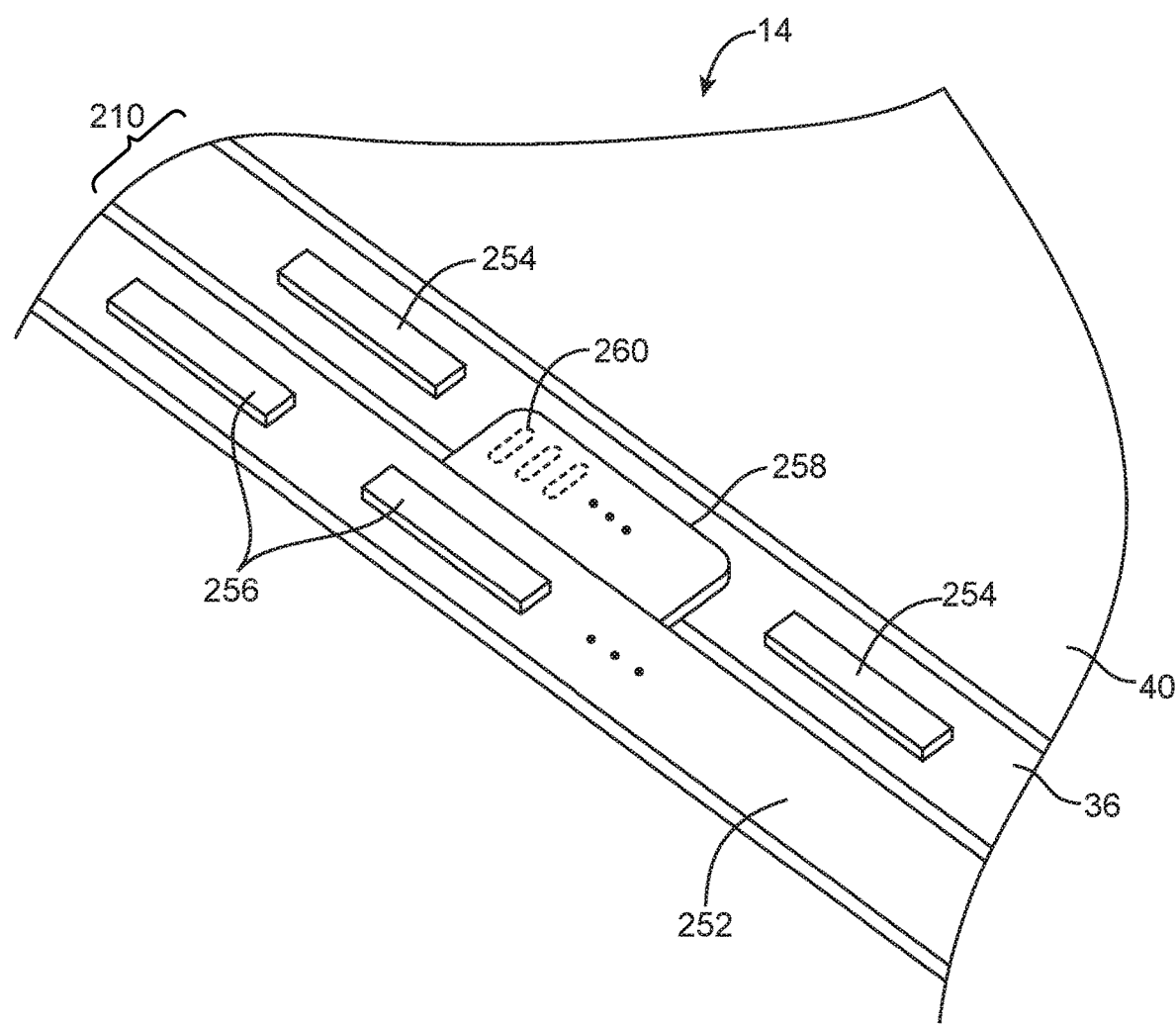
FIG. 23 is a perspective view of an edge portion of a display showing how a printed circuit may have integral flexible printed circuit tails for attaching display driver circuitry to a thin-film-transistor layer in the display in accordance with an embodiment of the present invention.

As shown in the perspective view of display 14 of FIG. 23, display 14 may be controlled using display driver integrated circuits such as integrated circuits 254 on thin-film transistor ledge 210 and integrated circuits 256 (e.g., timing circuits) on printed circuit structure 252. Printed circuit structure 252 may be formed from a rigid printed circuit substrate (e.g., a fiberglass-filled epoxy substrate or other rigid dielectric substrate). Integral flexible printed circuit tail 258 may protrude from rigid printed circuit substrate 252. With this type of "rigid flex" board, components 256 may be mounted on a rigid printed circuit substrate structure, whereas conductive traces on flexible printed circuit portion 258 such as traces 260 may be used in forming electrical connections between integrated circuits 256 and integrated circuits 254 on thin-film transistor ledge 210. Conductive adhesive or other suitable conductive attachment structures may be used to form electrical connections between the traces on flexible printed circuit tail 258 and corresponding traces on the surface of thin-film transistor layer 36. Traces on the surface of thin-film transistor layer 36 may be used to interconnect traces 260 and circuitry 256.

The foregoing is merely illustrative of the principles of this invention and various modifications can be made by those skilled in the art without departing from the scope and spirit of the invention.

What is claimed is:

1. An electronic device, comprising:
    a housing having a rib that extends around an entire perimeter of a recess, the recess having first and second orthogonal sections;
    a metal corner bracket in the recess, the metal corner bracket having first and second orthogonal portions that are respectively received with the first and second orthogonal sections of the recess;
    a display mounted in the housing, wherein the display has opposing upper and lower surfaces that overlap the rib, the recess, and the metal corner bracket; and
    an attachment structure that couples the lower surface of the display to only a portion of the rib.

2. The electronic device defined in claim 1 wherein the attachment structure comprises an adhesive-based structure.

3. The electronic device defined in claim 2 wherein the adhesive-based structure is opaque.

4. The electronic device defined in claim 2 wherein the adhesive-based structure comprises a black foam layer interposed between first and second black adhesive layers.

5. The electronic device defined in claim 1 further comprising an adhesive that retains the metal corner bracket in the recess.

6. The electronic device defined in claim 1 wherein the recess has first and second opposing sides and wherein the adhesive is located on the first side and not the second side.

7. The electronic device defined in claim 1 wherein the display has an edge surface between the upper and lower surfaces, the electronic device further comprising:
    a backlight unit configured to emit light; and
    an opaque coating on the edge surface of the display that is configured to block some of the light to reduce light leakage from the display.

8. The electronic device defined in claim 7 wherein the display includes a color filter layer and a thin-film transistor layer and wherein the edge surface is formed from portions of the color filter layer and the thin-film transistor layer.

9. An electronic device, comprising:
    a housing having first and second housing portions that rotate relative to one another, wherein the first housing portion has a raised edge surface and an exterior surface that forms at least part of an outer surface of the electronic device and wherein the raised edge surface has first and second portions separated by a recess;
    a corner bracket in the recess;
    a display mounted in the first housing portion, wherein the display comprises upper and lower surfaces; and
    an opaque adhesive that couples the lower surface to the first portion of the raised edge surface and not the second portion of the raised edge surface.

10. The electronic device defined in claim 9 wherein the opaque adhesive comprises a foam layer interposed between first and second adhesive layers.

11. The electronic device defined in claim 9 wherein the lower surface of the display is free to move relative to the second portion of the raised edge surface.

* * * * *